US012674380B2

(12) United States Patent
Becerril et al.

(10) Patent No.: US 12,674,380 B2
(45) Date of Patent: Jul. 7, 2026

(54) HYDRAULIC FRACTURING PROCESSES FOR SEQUENTIALLY INTRODUCING DIFFERRING PROPPANT-CONTAINING FRACTURING FLUIDS INTO SUBTERRANEAN FORMATIONS

(71) Applicant: ExxonMobil Technology and Engineering Company, Spring, TX (US)

(72) Inventors: Joseph C. Becerril, Houston, TX (US); P. Matthew Spiecker, Manvel, TX (US); Robert M. Shirley, The Woodlands, TX (US); Xiao Jin, Kingwood, TX (US); Timothy G. Benish, Spring, TX (US); Kendal K. Decker, Spring, TX (US); Chu-Shu Kao, Tomball, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/675,698

(22) Filed: May 28, 2024

(65) Prior Publication Data

US 2025/0237130 A1     Jul. 24, 2025

Related U.S. Application Data

(63) Continuation-in-part of application No. 18/417,492, filed on Jan. 19, 2024, now abandoned, and a
(Continued)

(51) Int. Cl.
*E21B 43/267*     (2006.01)
*C09K 8/80*     (2006.01)

(52) U.S. Cl.
CPC .............. *E21B 43/267* (2013.01); *C09K 8/80* (2013.01)

(58) Field of Classification Search
CPC ........ E21B 43/25; E21B 43/26; E21B 43/267; C09K 8/80; C09K 8/805; C09K 8/62; C09K 8/665; C09K 8/68
See application file for complete search history.

(56) References Cited

U.S. PATENT DOCUMENTS

| | | | |
|---|---|---|---|
| 1,754,765 A | 4/1930 | Parr et al. | |
| 3,089,542 A | 5/1963 | Kolodny | |
| | (Continued) | | |

FOREIGN PATENT DOCUMENTS

| | | | |
|---|---|---|---|
| CA | 684454 A | 4/1964 | |
| CA | 2863283 A1 | 3/2015 | |
| | (Continued) | | |

OTHER PUBLICATIONS

A. Abrams, "Mud Design To Minimize Rock Impairment Due To Particle Invasion", J Pet Technol 29 (05): 586-592, May 1, 1977.
(Continued)

*Primary Examiner* — Angela M DiTrani Leff
(74) *Attorney, Agent, or Firm* — Troutman Pepper Locke LLP; John Morrissett; Scott A. Bergeson

(57) ABSTRACT

A hydraulic fracturing process comprises, during a time interval T1, pumping a first fracturing fluid comprising first coke proppant particles into a subterranean formation, such that a first weight of the first coke proppant particles, WCP1, is pumped into the subterranean formation. The process also comprises, during a time interval T2 that occurs before or after T1, pumping a second fracturing fluid differing from the first fracturing fluid and comprising non-coke proppant particles and optionally second coke proppant particles into the subterranean formation, such that a second weight of the
(Continued)

1100

During Time Interval T1, Pump First Fracturing Fluid including First Coke Proppant Particles into Subterranean Formation, such that First Weight of First Coke Proppant Particles, WCP1, is Pumped into Subterranean Formation  — 1102

During Time Interval T2 that Occurs Before or After T1, Pump Second Fracturing Fluid Differing from First Fracturing Fluid and including Non-Coke Proppant Particles and Optionally Second Coke Proppant Particles into Subterranean Formation, such that Second Weight of Second Coke Proppant Particles, if any, WCP2, is Pumped into Subterranean Formation, where WCP1/WCP2 is Greater than or Equal to 1.2  — 1104 second coke proppant particles, if any, WCP2, is pumped into the subterranean formation, where WCP1/WCP2≥1.2.

39 Claims, 7 Drawing Sheets

Related U.S. Application Data continuation-in-part of application No. 18/417,478, filed on Jan. 19, 2024, now abandoned, and a continuation-in-part of application No. 18/417,433, filed on Jan. 19, 2024, now abandoned, and a continuation-in-part of application No. 18/417,483, filed on Jan. 19, 2024, now abandoned, and a continuation-in-part of application No. 18/417,488, filed on Jan. 19, 2024, now abandoned.

(56) References Cited

U.S. PATENT DOCUMENTS

| | | | |
|---|---|---|---|
| 3,283,817 A | | 11/1966 | Roberts |
| 3,659,651 A | | 5/1972 | Graham |
| 3,661,543 A | | 5/1972 | Saxton |
| 3,664,420 A | * | 5/1972 | Graham ................... C09K 8/80 166/280.2 |
| 3,700,032 A | | 10/1972 | Terry et al. |
| 3,702,516 A | | 11/1972 | Luckenbach |
| 3,759,676 A | | 9/1973 | Lahn |
| 3,816,084 A | | 6/1974 | Moser et al. |
| 4,036,750 A | | 7/1977 | Jaros et al. |
| 4,269,696 A | | 5/1981 | Metrailer |
| 4,741,840 A | | 5/1988 | Atherton et al. |
| 4,796,701 A | | 1/1989 | Hudson et al. |
| 4,957,174 A | | 9/1990 | Whitfill et al. |
| 5,189,102 A | | 2/1993 | Tsubuko et al. |
| 5,215,143 A | | 6/1993 | Gentry |
| 5,604,184 A | | 2/1997 | Ellis et al. |
| 5,889,137 A | | 3/1999 | Hutchings et al. |
| 5,899,272 A | | 5/1999 | Loree |
| 6,016,879 A | | 1/2000 | Burts, Jr. |
| 6,035,936 A | | 3/2000 | Whalen |
| 6,059,034 A | | 5/2000 | Rickards et al. |
| 6,283,212 B1 | | 9/2001 | Hinkel et al. |
| 6,330,916 B1 | | 12/2001 | Rickards et al. |
| 6,720,290 B2 | | 4/2004 | England et al. |
| 6,825,152 B2 | | 11/2004 | Green |
| 7,073,581 B2 | | 7/2006 | Nguyen et al. |
| 7,210,528 B1 | * | 5/2007 | Brannon ............... E21B 43/267 507/140 |
| 7,237,609 B2 | | 7/2007 | Nguyen |
| 7,249,500 B2 | | 7/2007 | Dutton et al. |
| 7,255,169 B2 | | 8/2007 | van Batenburg et al. |
| 7,270,879 B2 | | 9/2007 | McCrary |
| 7,325,608 B2 | | 2/2008 | van Batenburg et al. |
| 7,334,635 B2 | | 2/2008 | Nguyen |
| 7,337,839 B2 | | 3/2008 | Ayoub et al. |
| 7,424,911 B2 | | 9/2008 | McCarthy et al. |
| 7,450,053 B2 | | 11/2008 | Funk et al. |
| 7,472,751 B2 | | 1/2009 | Brannon et al. |
| 7,494,711 B2 | | 2/2009 | Kaufman et al. |
| 7,521,389 B2 | | 4/2009 | Shmotev et al. |
| 7,527,097 B2 | | 5/2009 | Patel |
| 7,528,096 B2 | | 5/2009 | Brannon et al. |
| 7,541,318 B2 | | 6/2009 | Weaver et al. |
| 7,568,524 B2 | | 8/2009 | Blackburn et al. |
| 7,598,898 B1 | | 10/2009 | Funk et al. |
| 7,612,021 B2 | | 11/2009 | Chatterji et al. |
| 7,648,934 B2 | | 1/2010 | Shmotev et al. |
| 7,669,657 B2 | | 3/2010 | Symington et al. |
| 7,699,106 B2 | | 4/2010 | Brannon et al. |
| 7,703,531 B2 | | 4/2010 | Huang et al. |
| 7,721,803 B2 | | 5/2010 | Huang et al. |
| 7,726,399 B2 | | 6/2010 | Brannon et al. |
| 7,727,940 B2 | | 6/2010 | Reddy et al. |
| 7,735,556 B2 | | 6/2010 | Misselbrook et al. |
| 7,772,163 B1 | | 8/2010 | Brannon et al. |
| 7,789,147 B2 | | 9/2010 | Brannon et al. |
| 7,790,656 B2 | | 9/2010 | Windebank et al. |
| 7,825,053 B2 | | 11/2010 | Duenckel et al. |
| 7,833,947 B1 | | 11/2010 | Kubala |
| 7,841,411 B2 | | 11/2010 | Fuller et al. |
| 7,900,702 B2 | | 3/2011 | Reddy et al. |
| 7,918,277 B2 | | 4/2011 | Brannon et al. |
| 7,954,548 B2 | | 6/2011 | Curimbaba et al. |
| 7,971,644 B2 | | 7/2011 | Ladva et al. |
| 8,003,214 B2 | | 8/2011 | Rediger et al. |
| 8,006,755 B2 | | 8/2011 | Bicerano |
| 8,058,213 B2 | | 11/2011 | Rediger et al. |
| 8,061,427 B2 | | 11/2011 | Jackson et al. |
| 8,063,000 B2 | | 11/2011 | Wilson |
| 8,082,994 B2 | | 12/2011 | Nguyen et al. |
| 8,091,637 B2 | | 1/2012 | Fripp |
| 8,104,537 B2 | | 1/2012 | Kaminsky |
| 8,113,283 B2 | | 2/2012 | Welton et al. |
| 8,127,844 B2 | | 3/2012 | Luharuka et al. |
| 8,127,849 B2 | | 3/2012 | Gupta |
| 8,127,850 B2 | | 3/2012 | Brannon et al. |
| 8,167,043 B2 | | 5/2012 | Willberg et al. |
| 8,178,477 B2 | | 5/2012 | Skala et al. |
| 8,227,026 B2 | | 7/2012 | McDaniel et al. |
| 8,236,737 B2 | | 8/2012 | Fan et al. |
| 8,240,383 B2 | | 8/2012 | Xu et al. |
| 8,281,857 B2 | | 10/2012 | Willberg et al. |
| 8,291,978 B2 | | 10/2012 | Hutchins et al. |
| 8,327,940 B2 | | 12/2012 | Boronin et al. |
| 8,354,939 B2 | | 1/2013 | McDaniel et al. |
| 8,360,149 B2 | | 1/2013 | Hughes et al. |
| 8,361,373 B1 | | 1/2013 | Byron |
| 8,420,578 B2 | | 4/2013 | Usova et al. |
| 8,459,353 B2 | | 6/2013 | Hughes et al. |
| 8,496,057 B2 | | 7/2013 | Ferrero et al. |
| 8,540,024 B2 | | 9/2013 | Kosarev et al. |
| 8,584,755 B2 | | 11/2013 | Willberg et al. |
| 8,596,355 B2 | | 12/2013 | Kaminsky et al. |
| 8,596,361 B2 | | 12/2013 | Willberg et al. |
| 8,596,362 B2 | | 12/2013 | Nelson |
| 8,603,578 B2 | | 12/2013 | Smith et al. |
| 8,607,870 B2 | | 12/2013 | Gu et al. |
| 8,613,314 B2 | | 12/2013 | Garcia-Lopez de Victoria et al. |
| 8,614,157 B2 | | 12/2013 | Pope et al. |
| 8,701,774 B2 | | 4/2014 | Johnson, Sr. |
| 8,739,878 B2 | | 6/2014 | Brannon et al. |
| 8,770,294 B2 | | 7/2014 | Tanguay et al. |
| 8,772,207 B2 | | 7/2014 | Geary et al. |
| 8,869,888 B2 | | 10/2014 | Cramer et al. |
| 8,931,553 B2 | | 1/2015 | Cannan et al. |
| 8,936,083 B2 | | 1/2015 | Nguyen |
| 8,944,164 B2 | | 2/2015 | Veldman et al. |
| 8,959,954 B2 | | 2/2015 | Koseski et al. |
| 8,960,284 B2 | | 2/2015 | Nguyen et al. |
| 8,978,764 B2 | | 3/2015 | Dusseault et al. |
| 8,993,489 B2 | | 3/2015 | McDaniel et al. |
| 9,010,424 B2 | | 4/2015 | Agrawal et al. |
| 9,023,770 B2 | | 5/2015 | Todd et al. |
| 9,080,441 B2 | | 7/2015 | Meurer et al. |
| 9,091,161 B2 | | 7/2015 | Brannon |
| 9,096,790 B2 | | 8/2015 | McCrary et al. |
| 9,097,097 B2 | | 8/2015 | DiFoggio et al. |
| 9,102,867 B2 | | 8/2015 | Parse et al. |
| 9,109,992 B2 | | 8/2015 | Wang |
| 9,140,118 B2 | | 9/2015 | Kulkarni et al. |
| 9,145,513 B2 | | 9/2015 | Pershikova et al. |
| 9,175,210 B2 | | 11/2015 | Eldred et al. |
| 9,175,529 B2 | | 11/2015 | Jamison et al. |
| 9,228,041 B2 | | 1/2016 | Martinez-Castro et al. |
| 9,234,127 B2 | | 1/2016 | De Paiva Cortes et al. |
| 9,234,415 B2 | | 1/2016 | Hughes et al. |
| 9,243,491 B2 | | 1/2016 | McDaniel et al. |
| 9,290,689 B2 | | 3/2016 | Lafitte et al. |
| 9,291,045 B2 | | 3/2016 | Wheeler et al. |
| 9,315,719 B2 | | 4/2016 | Fang et al. |
| 9,322,269 B2 | | 4/2016 | Matherly et al. |
| 9,353,613 B2 | | 5/2016 | Soliman et al. |

(56) References Cited

U.S. PATENT DOCUMENTS

| | | | |
|---|---|---|---|
| 9,388,334 | B2 | 7/2016 | Hughes et al. |
| 9,458,710 | B2 | 10/2016 | Makarychev-Mikhailov et al. |
| 9,523,268 | B2 | 12/2016 | Potapenko et al. |
| 9,556,376 | B2 | 1/2017 | Huang et al. |
| 9,574,130 | B2 | 2/2017 | Gupta |
| 9,611,423 | B2 | 4/2017 | Zhang et al. |
| 9,631,137 | B2 | 4/2017 | Fuss et al. |
| 9,638,016 | B2 | 5/2017 | Horvath Szabo et al. |
| 9,643,774 | B2 | 5/2017 | Oren |
| 9,650,881 | B2 | 5/2017 | Clem |
| 9,657,219 | B2 | 5/2017 | Rodriguez |
| 9,670,400 | B2 | 6/2017 | Eldred et al. |
| 9,670,762 | B2 | 6/2017 | Nguyen et al. |
| 9,670,763 | B2 | 6/2017 | Fang et al. |
| 9,670,764 | B2 | 6/2017 | Lesko et al. |
| 9,688,905 | B2 | 6/2017 | Nguyen et al. |
| 9,701,589 | B2 | 7/2017 | Schofalvi |
| 9,715,026 | B2 | 7/2017 | Ejofodomi et al. |
| 9,719,011 | B2 | 8/2017 | Tanguay et al. |
| 9,732,269 | B2 | 8/2017 | Bicerano |
| 9,732,561 | B2 | 8/2017 | Carter, Jr. |
| 9,739,122 | B2 | 8/2017 | Symington et al. |
| 9,745,841 | B2 | 8/2017 | Marino et al. |
| 9,783,727 | B2 | 10/2017 | Lahman et al. |
| 9,790,422 | B2 | 10/2017 | McDaniel |
| 9,803,135 | B2 | 10/2017 | Barron et al. |
| 9,816,364 | B2 | 11/2017 | Kruspe et al. |
| 9,845,427 | B2 | 12/2017 | Soane et al. |
| 9,845,428 | B2 | 12/2017 | Soane et al. |
| 9,850,748 | B2 | 12/2017 | Nguyen et al. |
| 9,862,879 | B2 | 1/2018 | Chatterjee et al. |
| 9,879,175 | B2 | 1/2018 | Aines et al. |
| 9,896,618 | B2 | 2/2018 | Huang et al. |
| 9,896,619 | B2 | 2/2018 | Nguyen et al. |
| 9,902,899 | B2 | 2/2018 | Parse et al. |
| 9,914,872 | B2 | 3/2018 | Wehunt et al. |
| 9,920,607 | B2 | 3/2018 | Brannon et al. |
| 9,920,610 | B2 | 3/2018 | Nelson et al. |
| 9,932,521 | B2 | 4/2018 | Soane et al. |
| 9,938,454 | B2 | 4/2018 | Tanguay et al. |
| 9,938,811 | B2 | 4/2018 | Bestaoui-Spurr et al. |
| 9,944,845 | B2 | 4/2018 | Tanguay et al. |
| 9,957,440 | B2 | 5/2018 | Nguyen et al. |
| 9,995,125 | B2 | 6/2018 | Madasu et al. |
| 10,001,003 | B2 | 6/2018 | Dusseault et al. |
| 10,001,769 | B2 | 6/2018 | Huang et al. |
| 10,011,763 | B2 | 7/2018 | Hartman et al. |
| 10,017,688 | B1 | 7/2018 | Green et al. |
| 10,023,791 | B1 | 7/2018 | Corcoran et al. |
| 10,060,244 | B2 | 8/2018 | Nguyen et al. |
| 10,081,758 | B2 | 9/2018 | Dreyer et al. |
| 10,082,013 | B2 | 9/2018 | Nguyen et al. |
| 10,087,735 | B2 | 10/2018 | Brannon |
| 10,093,849 | B2 | 10/2018 | Windebank et al. |
| 10,106,728 | B2 | 10/2018 | Dusterhoft et al. |
| 10,106,732 | B2 | 10/2018 | Cannan et al. |
| 10,113,106 | B2 | 10/2018 | Wadekar |
| 10,113,406 | B1 | 10/2018 | Gomaa et al. |
| 10,138,415 | B2 | 11/2018 | Bryant et al. |
| 10,150,907 | B2 | 12/2018 | Weaver et al. |
| 10,202,836 | B2 | 2/2019 | Veldman et al. |
| 10,208,243 | B2 | 2/2019 | Burks et al. |
| 10,214,682 | B2 | 2/2019 | Nguyen et al. |
| 10,221,660 | B2 | 3/2019 | Moeller et al. |
| 10,227,525 | B2 | 3/2019 | Monroe et al. |
| 10,233,386 | B2 | 3/2019 | Chatterjee et al. |
| 10,240,447 | B2 | 3/2019 | Gupta et al. |
| 10,253,250 | B2 | 4/2019 | Nguyen et al. |
| 10,266,758 | B2 | 4/2019 | Rediger |
| 10,267,133 | B2 | 4/2019 | Gullickson et al. |
| 10,267,134 | B2 | 4/2019 | Cannan et al. |
| 10,280,363 | B2 | 5/2019 | Suzart et al. |
| 10,287,482 | B2 | 5/2019 | Ferm et al. |
| 10,287,867 | B2 | 5/2019 | Nguyen et al. |
| 10,301,920 | B2 | 5/2019 | Green et al. |
| 10,352,145 | B2 | 7/2019 | Maxwell et al. |
| 10,364,660 | B2 | 7/2019 | Nguyen et al. |
| 10,369,724 | B2 | 8/2019 | Ortega Andrade et al. |
| 10,370,586 | B2 | 8/2019 | Fitzgerald et al. |
| 10,370,950 | B2 | 8/2019 | Gupta et al. |
| 10,400,054 | B2 | 9/2019 | Viswanath et al. |
| 10,421,897 | B2 | 9/2019 | Skiba et al. |
| 10,428,266 | B2 | 10/2019 | Nguyen et al. |
| 10,428,267 | B2 | 10/2019 | Cannan et al. |
| 10,457,855 | B2 | 10/2019 | Mahmoud et al. |
| 10,457,859 | B2 | 10/2019 | Robl et al. |
| 10,458,220 | B2 | 10/2019 | Switzer et al. |
| 10,479,704 | B2 | 11/2019 | Hayes et al. |
| 10,479,929 | B2 | 11/2019 | Gupta |
| 10,519,361 | B2 | 12/2019 | Wadekar et al. |
| 10,519,364 | B2 | 12/2019 | Stephens et al. |
| 10,538,696 | B2 | 1/2020 | Allen et al. |
| 10,538,697 | B2 | 1/2020 | Nguyen et al. |
| 10,557,335 | B2 | 2/2020 | Potapenko et al. |
| 10,590,265 | B2 | 3/2020 | Yalcin et al. |
| 10,590,324 | B2 | 3/2020 | Kulkarni et al. |
| 10,590,763 | B2 | 3/2020 | Sen et al. |
| 10,611,954 | B2 | 4/2020 | Ramos et al. |
| 10,640,388 | B2 | 5/2020 | Akbar et al. |
| 10,640,701 | B2 | 5/2020 | Montalvo et al. |
| 10,647,907 | B2 | 5/2020 | Nguyen et al. |
| 10,647,908 | B2 | 5/2020 | Favero |
| 10,647,910 | B1 | 5/2020 | Nguyen et al. |
| 10,655,408 | B2 | 5/2020 | Goloshchapova |
| 10,655,443 | B2 | 5/2020 | Gomaa et al. |
| 10,655,444 | B2 | 5/2020 | Nguyen et al. |
| 10,655,466 | B2 | 5/2020 | Kabannik |
| 10,661,981 | B2 | 5/2020 | Oren et al. |
| 10,689,972 | B1 | 6/2020 | Zhao et al. |
| 10,711,564 | B2 | 7/2020 | Dusterhoft et al. |
| 10,723,938 | B2 | 7/2020 | Johnson, Sr. |
| 10,738,581 | B2 | 8/2020 | Nguyen et al. |
| 10,738,582 | B2 | 8/2020 | Nguyen et al. |
| 10,738,584 | B2 | 8/2020 | Nguyen et al. |
| 10,745,611 | B2 | 8/2020 | Nguyen et al. |
| 10,752,828 | B2 | 8/2020 | Gomaa et al. |
| 10,767,101 | B2 | 9/2020 | Kovalchuk et al. |
| 10,767,104 | B2 | 9/2020 | Do et al. |
| 10,793,768 | B2 | 10/2020 | Patel et al. |
| 10,801,307 | B2 | 10/2020 | Roussel et al. |
| 10,808,167 | B2 | 10/2020 | Beuterbaugh et al. |
| 10,808,168 | B2 | 10/2020 | Montenegro Galindo et al. |
| 10,808,497 | B2 | 10/2020 | Potapenko et al. |
| 10,808,515 | B1 | 10/2020 | Sierra et al. |
| 10,815,420 | B2 | 10/2020 | Shroff Rama et al. |
| 10,823,646 | B1 | 11/2020 | Guo et al. |
| 10,844,280 | B2 | 11/2020 | Goyal et al. |
| 10,851,283 | B2 | 12/2020 | Potapenko et al. |
| 10,870,792 | B2 | 12/2020 | López Reyes et al. |
| 10,876,044 | B2 | 12/2020 | Salla et al. |
| 10,882,751 | B2 | 1/2021 | Shahsavari et al. |
| 10,900,339 | B2 | 1/2021 | Schipper et al. |
| 10,914,139 | B2 | 2/2021 | Shahri et al. |
| 10,920,130 | B2 | 2/2021 | Nguyen et al. |
| 10,920,558 | B2 | 2/2021 | Nguyen et al. |
| 10,934,476 | B1 | 3/2021 | Kamavaram et al. |
| 10,941,336 | B2 | 3/2021 | Pantsurkin et al. |
| 10,947,447 | B2 | 3/2021 | Hendrickson et al. |
| 10,954,430 | B2 | 3/2021 | Plishka et al. |
| 10,954,431 | B2 | 3/2021 | Chittattukara et al. |
| 10,954,768 | B2 | 3/2021 | Gullickson et al. |
| 10,961,444 | B1 | 3/2021 | Bestaoui-Spurr et al. |
| 10,975,295 | B2 | 4/2021 | Cannan et al. |
| 10,984,156 | B2 | 4/2021 | Wu et al. |
| 10,988,674 | B2 | 4/2021 | Nguyen et al. |
| 10,988,679 | B2 | 4/2021 | Calvin |
| 10,989,034 | B2 | 4/2021 | Lin et al. |
| 11,008,506 | B2 | 5/2021 | Nguyen et al. |
| 11,008,845 | B2 | 5/2021 | Singh et al. |
| 11,015,437 | B2 | 5/2021 | Zhang et al. |
| 11,021,649 | B2 | 6/2021 | Bai et al. |
| 11,028,318 | B2 | 6/2021 | Cannan et al. |
| 11,078,409 | B2 | 8/2021 | Allison |
| 11,104,841 | B2 | 8/2021 | Hill et al. |

(56) References Cited

U.S. PATENT DOCUMENTS

| | | | |
|---|---|---|---|
| 11,111,766 B2 | 9/2021 | Brannon et al. |
| 11,124,696 B2 | 9/2021 | Khamatnurova et al. |
| 11,125,068 B2 | 9/2021 | Jiang et al. |
| 11,142,680 B2 | 10/2021 | Dreyer et al. |
| 11,155,751 B2 | 10/2021 | Bestaoui-Spurr et al. |
| 11,162,022 B2 | 11/2021 | Cannan et al. |
| 11,162,347 B2 | 11/2021 | Yu et al. |
| 11,180,691 B2 | 11/2021 | Sodhi et al. |
| 11,230,660 B2 | 1/2022 | Nguyen et al. |
| 11,236,599 B2 | 2/2022 | Nguyen et al. |
| 11,254,857 B2 | 2/2022 | Cox et al. |
| 11,255,176 B2 | 2/2022 | Nguyen et al. |
| 11,274,243 B2 | 3/2022 | Siddiqui et al. |
| 11,280,172 B2 | 3/2022 | Peng et al. |
| 11,313,211 B2 | 4/2022 | Johnson |
| 11,313,214 B2 | 4/2022 | Nguyen et al. |
| 11,319,482 B2 | 5/2022 | Rahy et al. |
| 11,326,088 B2 | 5/2022 | Todd |
| 11,339,323 B2 | 5/2022 | Roper et al. |
| 11,345,848 B2 | 5/2022 | Khamatnurova et al. |
| 11,352,551 B2 | 6/2022 | Agrawal et al. |
| 11,365,341 B2 | 6/2022 | Patil et al. |
| 11,377,581 B2 | 7/2022 | Belakshe et al. |
| 11,377,944 B2 | 7/2022 | Santra et al. |
| 11,396,800 B2 | 7/2022 | Madasu et al. |
| 11,407,932 B2 | 8/2022 | Deysarkar et al. |
| 11,408,281 B2 | 8/2022 | Lu et al. |
| 11,414,974 B2 | 8/2022 | Entchev et al. |
| 11,427,753 B2 | 8/2022 | Ortega Andrade et al. |
| 11,428,087 B2 | 8/2022 | Nguyen et al. |
| 11,428,839 B2 | 8/2022 | Mukherjee |
| 11,434,740 B1 | 9/2022 | Nguyen et al. |
| 11,441,406 B2 | 9/2022 | Nguyen et al. |
| 11,447,690 B2 | 9/2022 | Nguyen et al. |
| 11,447,693 B2 | 9/2022 | Jenkins et al. |
| 11,459,500 B2 | 10/2022 | Khamatnurova et al. |
| 11,465,155 B1 | 10/2022 | Mitchell et al. |
| 11,466,201 B2 | 10/2022 | Smith, Jr. et al. |
| 11,485,901 B2 | 11/2022 | Shen et al. |
| 11,486,241 B2 | 11/2022 | Nelson et al. |
| 11,492,543 B2 | 11/2022 | Gordon et al. |
| 11,506,584 B2 | 11/2022 | Martysevich et al. |
| 11,512,025 B2 | 11/2022 | Eldred et al. |
| 11,535,588 B2 | 12/2022 | Favero et al. |
| 11,536,125 B1 | 12/2022 | Yang et al. |
| 11,560,776 B2 | 1/2023 | Madasu |
| 11,566,488 B2 | 1/2023 | Brandl et al. |
| 11,566,504 B2 | 1/2023 | Perez et al. |
| 11,568,111 B2 | 1/2023 | Zhou et al. |
| 11,578,262 B2 | 2/2023 | Gordon et al. |
| 11,590,469 B2 | 2/2023 | Cho et al. |
| 11,591,903 B2 | 2/2023 | Mukherjee |
| 11,597,872 B2 | 3/2023 | Conkle |
| 11,608,724 B2 | 3/2023 | Chopade et al. |
| 11,608,740 B2 | 3/2023 | Moos et al. |
| 11,613,691 B1 | 3/2023 | Pollock |
| 11,613,989 B2 | 3/2023 | Zhang et al. |
| 11,629,284 B1 | 4/2023 | Saini et al. |
| 11,629,581 B2 | 4/2023 | Cook |
| 11,643,592 B1 | 5/2023 | Saini et al. |
| 11,649,398 B1 | 5/2023 | AlTammar et al. |
| 11,656,002 B2 | 5/2023 | Nevison et al. |
| 11,661,842 B2 | 5/2023 | Dalamarinis et al. |
| 11,667,831 B2 | 6/2023 | Liang et al. |
| 11,667,832 B2 | 6/2023 | Saini et al. |
| 11,674,074 B2 | 6/2023 | Sherman |
| 11,692,127 B2 | 7/2023 | Dawson et al. |
| 11,692,424 B2 | 7/2023 | Nguyen et al. |
| 11,697,759 B1 | 7/2023 | Dusterhoft et al. |
| 11,697,760 B2 | 7/2023 | Stover et al. |
| 11,702,587 B2 | 7/2023 | Li et al. |
| 11,702,588 B1 | 7/2023 | Saini et al. |
| 11,713,414 B1 | 8/2023 | Dobson et al. |
| 11,732,179 B2 | 8/2023 | Vidma et al. |
| 11,753,584 B2 | 9/2023 | Mazrooee et al. |
| 11,753,919 B2 | 9/2023 | Velikanov et al. |
| 11,753,923 B2 | 9/2023 | Dalamarinis |
| 11,767,466 B2 | 9/2023 | Santra et al. |
| 11,781,062 B1 | 10/2023 | Liu et al. |
| 11,781,412 B2 | 10/2023 | Zhang et al. |
| 11,814,923 B2 | 11/2023 | Sherman et al. |
| 11,827,845 B2 | 11/2023 | Vigderman et al. |
| 11,840,911 B2 | 12/2023 | Fan et al. |
| 11,845,895 B2 | 12/2023 | Montalvo et al. |
| 11,859,129 B2 | 1/2024 | Uddenburg et al. |
| 11,859,489 B2 | 1/2024 | Werry et al. |
| 11,876,398 B1 | 1/2024 | Heath et al. |
| 11,965,677 B2 | 4/2024 | Cook et al. |
| 12,037,894 B2 | 7/2024 | Zhang et al. |
| 2001/0001308 A1 | 5/2001 | Varadaraj et al. |
| 2004/0014824 A1 | 1/2004 | Leinweber et al. |
| 2004/0040708 A1 | 3/2004 | Stephenson et al. |
| 2005/0244641 A1 | 11/2005 | Vincent |
| 2005/0274523 A1 | 12/2005 | Brannon et al. |
| 2006/0073980 A1 | 4/2006 | Brannon et al. |
| 2006/0175059 A1 | 8/2006 | Sinclair et al. |
| 2006/0272816 A1 | 12/2006 | Willberg et al. |
| 2008/0135246 A1 | 6/2008 | Canova et al. |
| 2008/0156489 A1 | 7/2008 | Pershikova et al. |
| 2009/0038797 A1 | 2/2009 | Skala et al. |
| 2009/0038799 A1 | 2/2009 | Garcia-Lopez de Victoria et al. |
| 2009/0075847 A1 | 3/2009 | Wawrzos et al. |
| 2009/0283447 A1 | 11/2009 | D'Elia et al. |
| 2010/0179077 A1 | 7/2010 | Turakhia et al. |
| 2010/0263865 A1 | 10/2010 | Willberg et al. |
| 2011/0082033 A1 | 4/2011 | Frohs et al. |
| 2011/0111990 A1 | 5/2011 | Pershikova et al. |
| 2011/0118155 A1 | 5/2011 | Pisklak et al. |
| 2012/0043080 A1 | 2/2012 | Edwards |
| 2012/0088699 A1 | 4/2012 | Qin |
| 2012/0241168 A1 | 9/2012 | Pei et al. |
| 2012/0267102 A1 | 10/2012 | Huang et al. |
| 2013/0025867 A1 | 1/2013 | Sun et al. |
| 2014/0014338 A1 | 1/2014 | Crews et al. |
| 2014/0096952 A1 | 4/2014 | Hocking |
| 2014/0196898 A1 | 7/2014 | Tanguay et al. |
| 2014/0209390 A1 | 7/2014 | Jamison et al. |
| 2014/0353042 A1 | 12/2014 | Karale et al. |
| 2015/0167437 A1 | 6/2015 | Dawson |
| 2015/0211346 A1 | 7/2015 | Potapenko et al. |
| 2015/0233226 A1 | 8/2015 | Holzhauser et al. |
| 2015/0247084 A1 | 9/2015 | Epstein |
| 2015/0292279 A1 | 10/2015 | Wang |
| 2015/0361331 A1 | 12/2015 | Tanguay et al. |
| 2016/0137910 A1 | 5/2016 | Chang et al. |
| 2016/0215205 A1 | 7/2016 | Nguyen et al. |
| 2016/0319185 A1 | 11/2016 | Semenov et al. |
| 2016/0326300 A1 | 11/2016 | Gelves et al. |
| 2016/0340573 A1 | 11/2016 | Semenov et al. |
| 2017/0145302 A1 | 5/2017 | Qin et al. |
| 2017/0198209 A1 | 7/2017 | Stephenson et al. |
| 2017/0321105 A1 | 11/2017 | McDaniel et al. |
| 2018/0066179 A1 | 3/2018 | Nguyen et al. |
| 2018/0282222 A1 | 10/2018 | Khan |
| 2018/0339946 A1 | 11/2018 | Öttinger et al. |
| 2019/0016944 A1 | 1/2019 | Eldred et al. |
| 2019/0048146 A1 | 2/2019 | Dei Santi et al. |
| 2019/0112520 A1 | 4/2019 | Knoer et al. |
| 2019/0241789 A1 | 8/2019 | Agapiou et al. |
| 2019/0330520 A1 | 10/2019 | Cannan et al. |
| 2020/0056090 A1* | 2/2020 | Nguyen ................... C09K 8/88 |
| 2020/0131431 A1 | 4/2020 | Russum |
| 2020/0157415 A1 | 5/2020 | Quintero et al. |
| 2020/0208047 A1 | 7/2020 | Gordon et al. |
| 2020/0306710 A1 | 10/2020 | Cho et al. |
| 2020/0370405 A1 | 11/2020 | Nguyen et al. |
| 2021/0002994 A1 | 1/2021 | Zhou et al. |
| 2021/0087459 A1 | 3/2021 | Patil et al. |
| 2021/0131261 A1 | 5/2021 | Wang et al. |
| 2021/0207465 A1 | 7/2021 | Nguyen et al. |
| 2021/0229049 A1 | 7/2021 | Mazrooee et al. |
| 2021/0246364 A1 | 8/2021 | Gordon et al. |
| 2021/0253943 A1 | 8/2021 | Ghosh et al. |
| 2021/0253944 A1 | 8/2021 | Gordon et al. |

(56) References Cited

U.S. PATENT DOCUMENTS

| | | |
|---|---|---|
| 2021/0317733 A1 | 10/2021 | Downey |
| 2021/0340432 A1 | 11/2021 | Bhaduri et al. |
| 2022/0090475 A1 | 3/2022 | Radwan |
| 2022/0112422 A1 | 4/2022 | Liang et al. |
| 2022/0169915 A1 | 6/2022 | Barron et al. |
| 2022/0186605 A1 | 6/2022 | Quan et al. |
| 2022/0340809 A1 | 10/2022 | Li et al. |
| 2022/0349801 A1 | 11/2022 | Al-Boghail et al. |
| 2023/0085175 A1 | 3/2023 | Smalls et al. |
| 2023/0119075 A1* | 4/2023 | Hall ...................... E21B 43/267 |
| | | 166/297 |
| 2023/0123954 A1 | 4/2023 | Maity et al. |
| 2023/0132325 A1 | 4/2023 | Gordon et al. |
| 2023/0134440 A1 | 5/2023 | Decker |
| 2023/0147476 A1 | 5/2023 | Wheelock et al. |
| 2023/0167354 A1 | 6/2023 | Stojkovic et al. |
| 2023/0174848 A1 | 6/2023 | Uddenburg et al. |
| 2023/0175377 A1 | 6/2023 | Nedwed et al. |
| 2023/0182098 A1* | 6/2023 | Cho ......................... C04B 35/10 |
| | | 201/17 |
| 2023/0183561 A1 | 6/2023 | Carroll et al. |
| 2023/0203362 A1 | 6/2023 | Calvin |
| 2023/0229830 A1 | 7/2023 | Zhao et al. |
| 2023/0257646 A1 | 8/2023 | Robl et al. |
| 2023/0279285 A1 | 9/2023 | Shirley |
| 2023/0279286 A1 | 9/2023 | Gordon |
| 2023/0303911 A1 | 9/2023 | Radwan |
| 2023/0334199 A1 | 10/2023 | Lu et al. |
| 2024/0110471 A1 | 4/2024 | Zhang et al. |
| 2024/0228866 A1 | 7/2024 | Shirley et al. |
| 2024/0228867 A1 | 7/2024 | Stojkovic et al. |

FOREIGN PATENT DOCUMENTS

| | | | |
|---|---|---|---|
| CN | 203319922 U | 12/2013 | |
| CN | 109236262 A | 8/2020 | |
| CN | 109751029 B | 10/2021 | |
| PL | 234113 B1 | 3/2018 | |
| PL | 234114 B1 | 11/2018 | |
| WO | 2007141519 A2 | 12/2007 | |
| WO | 2008033225 A2 | 3/2008 | |
| WO | 2011163529 A1 | 12/2011 | |
| WO | 2012040025 A2 | 3/2012 | |
| WO | 2012051026 A2 | 4/2012 | |
| WO | 2012104582 A1 | 8/2012 | |
| WO | 2013059793 A2 | 4/2013 | |
| WO | 2013119507 A1 | 8/2013 | |
| WO | 2013158308 A1 | 10/2013 | |
| WO | 2013176977 A1 | 11/2013 | |
| WO | 2014039968 A1 | 3/2014 | |
| WO | 2014172953 A1 | 10/2014 | |
| WO | 2014172955 A1 | 10/2014 | |
| WO | 2015021523 A1 | 2/2015 | |
| WO | 2015031415 A2 | 3/2015 | |
| WO | 2015041690 A1 | 3/2015 | |
| WO | 2016033533 A1 | 3/2016 | |
| WO | 2016054022 A1 | 4/2016 | |
| WO | 2016074075 A1 | 5/2016 | |
| WO | 2016168719 A1 | 10/2016 | |
| WO | 2018001748 A1 | 1/2018 | |
| WO | 2018094123 A1 | 5/2018 | |
| WO | 2019164694 A1 | 8/2019 | |
| WO | 2019199431 A1 | 10/2019 | |
| WO | 2019/222034 A1 | 11/2019 | |
| WO | 2020131122 A1 | 6/2020 | |
| WO | 2020139472 A1 | 7/2020 | |
| WO | 2020185373 A1 | 9/2020 | |
| WO | 2021030287 A1 | 2/2021 | |
| WO | 2022232715 A1 | 11/2022 | |
| WO | 2022241338 A1 | 11/2022 | |
| WO | WO-2022241339 A1 * | 11/2022 | ............... C09K 8/62 |
| WO | 2023040535 A1 | 3/2023 | |
| WO | 2024131192 A1 | 6/2024 | |

OTHER PUBLICATIONS

Alvarez et al., "Wettability Alteration and Spontaneous Imbibition in Unconventional Liquid Reservoirs by Surfactant Additives", SPE Res 4:21): 107-117, Jun. 28, 2016.

Alzanam et al., "A Multiwalled Carbon Nanotube-Based Polyurethane Nanocomposite-Coated Sand/Proppant for Improved Mechanical Strength and Flowback Control in Hydraulic Fracturing Applications", ACS Omega, vol. 6, Issue 32, Aug. 5, 2021.

Arshadi et al., "Proppant-packed fractures in shale gas reservoirs: An in-situ investigation of deformation, wettability, and multiphase flow effects", Journal of Natural Gas Science and Engineering, vol. 59, Nov. 2018.

Arshadi et al., "The effect of deformation on two-phase flow through proppant-packed fractured shale samples: A micro-scale experimental investigation", Advances in Water Resources, vol. 105, Jul. 2017.

Calvin et al., "Enhancement of Well Production in the SCOOP Woodford Shale through the Application of Microproppant", Paper presented at the SPE Hydraulic Fracturing Technology Conference and Exhibition, The Woodlands, Texas, USA, Jan. 24, 2017.

Dahl et al., "Application of Micro-Proppant to Enhance Well Production in Unconventional Reservoirs: Laboratory and Field Results", Paper presented at the SPE Western Regional Meeting, Garden Grove, California, USA, Apr. 27, 2015.

Dong et al., "Effect of surface wettability of ceramic proppant on oil flow performance in hydraulic fractures", Energy Science & Engineering, vol. 7, issue 2, Feb. 19, 2019.

Edward Furimsky, "Characterization of cokes from fluid/flexicoking of heavy feeds", Fuel Processing Technology, vol. 67, No. 3, 205-230, XP055559715, Sep. 1, 2000, 5 pages.

Elkhatib et al., "Pore-Scale Study of Wettability Alteration and Fluid Flow in Propped Fractures of Ultra-Tight Carbonates", Langmuiir, Colume 39 Issue 5, Jan. 24, 2023.

Go et al., "Evaluation of Coated Proppant Unconventional Performance", Energy & Fuels, vol. 35, Issue 11, May 17, 2021.

Huang et al., "Effects of Proppant Wettability and Size on Transport and Retention of Coal Fines in Saturated Proppant Packs: Experimental and Theoretical Studies", Energy Fuels 2021, 35, 15, 11976-11991, Jul. 7, 2021.

International Search Report and the Written Opinion of the International Searching Authority, mailed Jun. 13, 2022, International Application No. PCT/US2022/070811, 10 pages.

International Search Report and the Written Opinion of the International Searching Authority, mailed Jun. 13, 2022, International Application No. PCT/US2022/070776, 10 pages.

International Search Report and the Written Opinion of the International Searching Authority, mailed May 19, 2023, International Application No. PCT/US2023/062816, 10 pages.

Jackson et al., "Stimulation Design and Treatment in the Sycamore Formation of the South Central Oklahoma Oil Province Area of the Anadarko Basin", Paper presented at the SPE Hydraulic Fracturing Technology Conference and Exhibition, The Woodlands, Texas, USA, Jan. 23, 2018.

Kumar et al., "The Role of Micro-Proppants in Conductive Fracture Network Development", Paper presented at the SPE Hydraulic Fracturing Technology Conference and Exhibition, The Woodlands, Texas, USA, Jan. 29, 2019.

Labus K. et al., "IOP Conference Series: Earth and Environmental Science Paper @Bullet Open Access The concept of coke based proppants for coal bed fracturing", XP055798892, Dec. 31, 2019, 12 pages.

Lau et al., "Maximizing Production from Shale Reservoir by Using Micro-Sized Proppants", Paper presented at the International Petroleum Technology Conference, Beijing, China, Mar. 22, 2019.

Le et al., "Methane foam performance in oil-wet unconsolidated porous media: A systematic experimental investigation at reservoir conditions", Fuel, vol. 344, Jul. 15, 2023.

Liao et al., "Lightweight proppants in unconventional oil and natural gas development: A review", Sustainable Materials and Technologies, vol. 33, Sep. 2022.

(56) References Cited

OTHER PUBLICATIONS

Mishra Debesh Devadutta, "Thermal Analysis of Polyethylene Terephthalate (PET)—Coke Composites Prepared by Mechanical Alloying Technique", XP055926292, DOI: 10.20944/preprints201608.0099.vl, Aug. 2, 2016, 21 pages.

Montgomery et al., "Utilizing Discrete Fracture Modeling and Microproppant to Predict and Sustain Production Improvements in Nano Darcy Rock", Paper presented at the SPE Hydraulic Fracturing Technology Conference and Exhibition, The Woodlands, Texas, USA, Jan. 28, 2020.

Ngata et al., "Review of Developments in Nanotechnology Application for Formation Damage Control", Energy & Fuels, vol. 36, Issue 1, Dec. 27, 2021.

Palisch et al., "Initial Observations From a Bakken Microproppant Field Trial", Paper presented at the SPE Hydraulic Fracturing Technology Conference and Exhibition, The Woodlands, Texas, USA, Jan. 24, 2023.

Radwan et al., "An Engineered Microparticles-Based Slurry Pumped in Over 10,000 Stages Provided Notable Operational and Production Improvements in Challenging Formations", Paper presented at the SPE Annual Technical Conference and Exhibition, Houston, Texas, USA, Sep. 26, 2022.

Tabatabaei et al., "Surface Modification of Proppant Using Hydrophobic Coating To Enhance Long-Term Production", SPE Production & Operations, vol. 36, Issue 1, Feb. 10, 2021.

Wang et al., "Effect of Fluid Contact Angle of Oil-Wet Fracture Proppant on the Competing Water/Oil Flow in Sandstone-Proppant Systems", Sustainability, Mar. 23, 2022.

Wang et al., "Experimental and numerical investigations of water-oil two-phase flow in fractures with proppants of different wetting properties", Journal of Petroleum Science and Engineering, vol. 214, Jul. 2022.

White Paper, "Significant Uplift Achieved with Production Enhancement Product", The Future of Well Enhancement, Deeprop Microproppant, 8 pages.

Wu et al., "An Experimental Investigation of the Conductivity of Unpropped Fractures in Shales", Paper presented at the SPE Hydraulic Fracturing Technology Conference and Exhibition, The Woodlands, Texas, USA, Jan. 24, 2017.

Xiao et al., "Effect of surface wetting behavior of ceramic proppant on the two-phase flow across the interface of sandstone and fracture", Energy Science & Engineering, vol. 8 issue 4, Dec. 19, 2019.

Chang, F.F., Berger, P.D., Lee C.H., "In-Situ Formation of Proppant and Highly Permeable Blocks for Hydraulic Fracturing", SPE-173328-MS, presented at SPE Hydraulic Fracturing Technology Conference, Woodlands, TX Feb. 3-5, 2015. Abstract.

International Search Report and Written Opinion, dated Apr. 27, 2021 issued in related PCT Application No. PCT/US2021/015152, 12 pages.

International Search Report and Written Opinion, dated Apr. 27, 2021 issued in related PCT Application No. PCT/US2021/015153, 11 pages.

International Search Report and Written Opinion, dated Jun. 18, 2023 issued in related PCT Application No. PCT/US2023/063275, 9 pages.

International Search Report and the Written Opinion of the International Searching Authority, mailed Feb. 28, 2025, International Application No. PCT/US2024/056651, 9 pages.

International Search Report and the Written Opinion of the International Searching Authority, mailed Feb. 17, 2025, International Application No. PCT/US2024/056647, 12 pages.

International Search Report and the Written Opinion of the International Searching Authority, mailed Feb. 17, 2025, International Application No. PCT/US2024/056648, 15 pages.

International Search Report and the Written Opinion of the International Searching Authority, mailed Feb. 17, 2025, International Application No. PCT/US2024/056649, 13 pages.

International Search Report and the Written Opinion of the International Searching Authority, mailed Feb. 24, 2025, International Application No. PCT/US2024/056652, 12 pages.

International Search Report and the Written Opinion of the International Searching Authority, mailed Jun. 10, 2025, International Application No. PCT/US2025/019906, 13 pages.

International Search Report and the Written Opinion of the International Searching Authority, mailed Jun. 10, 2025, International Application No. PCT/US2025/019904, 12 pages.

* cited by examiner

700

800

Figure 11:
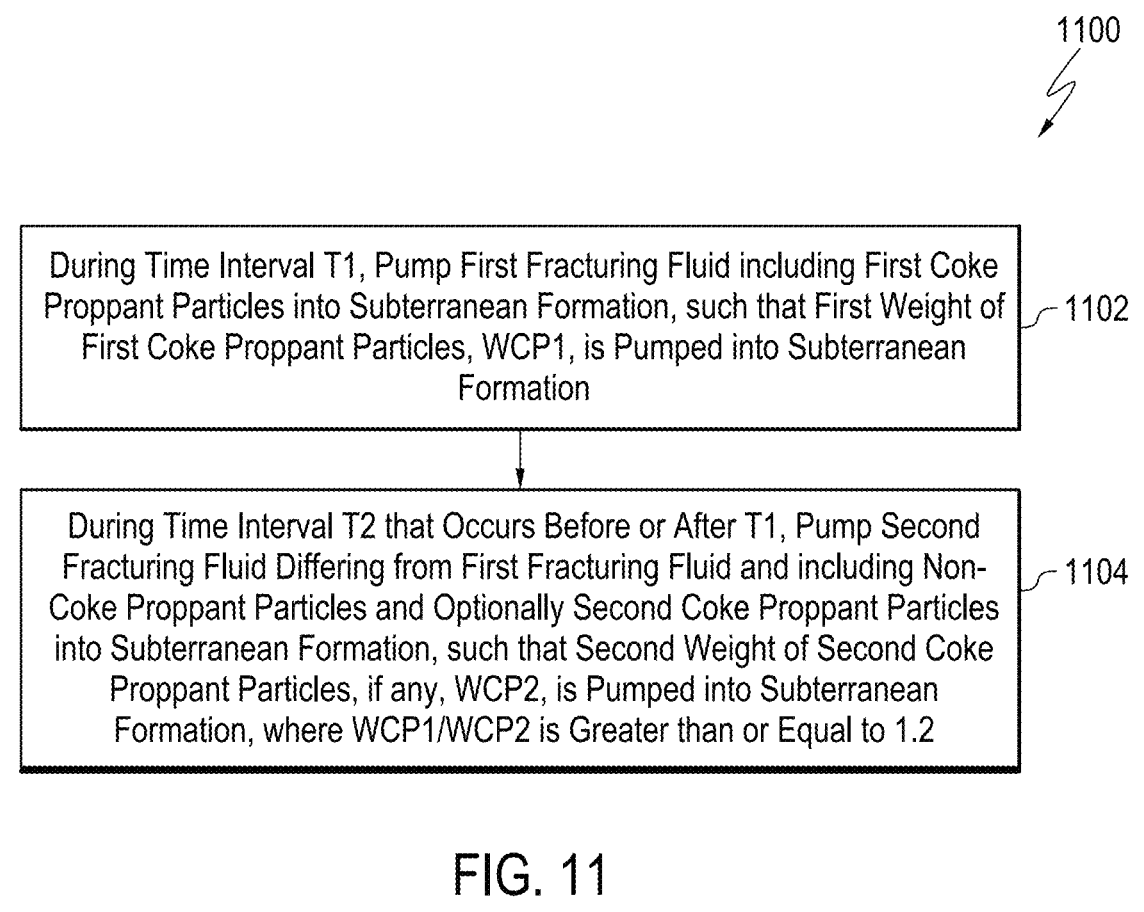

1100

During Time Interval T1, Pump First Fracturing Fluid including First Coke Proppant Particles into Subterranean Formation, such that First Weight of First Coke Proppant Particles, WCP1, is Pumped into Subterranean Formation ⌐1102

During Time Interval T2 that Occurs Before or After T1, Pump Second Fracturing Fluid Differing from First Fracturing Fluid and including Non-Coke Proppant Particles and Optionally Second Coke Proppant Particles into Subterranean Formation, such that Second Weight of Second Coke Proppant Particles, if any, WCP2, is Pumped into Subterranean Formation, where WCP1/WCP2 is Greater than or Equal to 1.2 ⌐1104

During Time Interval T1, Pump First Fracturing Fluid including First Coke Proppant Particles into Subterranean Formation, such that First Weight of First Coke Proppant Particles, WCP1, and Total Weight of Proppant Particles, WTP1, are Pumped into Subterranean Formation    1202

During Time Interval T2 that Occurs Before or After T1, Pump Second Fracturing Fluid including Non-Coke Proppant Particles and Optionally Second Coke Proppant Particles into Subterranean Formation, such that Second Weight of Second Coke Proppant Particles, if any, WCP2, and Total Weight of Proppant Particles, WTP2, are Pumped into Subterranean Formation, where WCP1/WCP2 is Greater than or Equal to 1.1 and WCP1/(WTP1 + WTP2) is Less than or Equal to 0.5    1204

FIG. 12

HYDRAULIC FRACTURING PROCESSES FOR SEQUENTIALLY INTRODUCING DIFFERRING PROPPANT-CONTAINING FRACTURING FLUIDS INTO SUBTERRANEAN FORMATIONS

CROSS-REFERENCE TO RELATED APPLICATION

This application claims priority to and the benefit of co-pending and commonly-assigned U.S. patent application Ser. No. 18/417,433, filed Jan. 19, 2024, titled "HYDRAULIC FRACTURING FLUID COMPRISING MICRO-PROPPANT COKE PARTICLES, METHOD FOR MAKING SAME, AND HYDRAULIC FRACTURING PROCESSES USING SAME," co-pending and commonly-assigned U.S. patent application Ser. No. 18/417,478, filed Jan. 19, 2024, titled "METHODS FOR PERFORMING REFRACTURING OPERATIONS USING COKE PROPPANT PARTICLES," co-pending and commonly-assigned U.S. patent application Ser. No. 18/417,492, filed Jan. 19, 2024, titled "PROPPANT PARTICLES FORMED FROM FLUID COKE AND FLEXICOKE, FRACTURING FLUIDS COMPRISING SUCH PROPPANT PARTICLES, AND METHODS RELATED THERETO," co-pending and commonly-assigned U.S. patent application Ser. No. 18/417,488, filed Jan. 19, 2024, titled "HYDRAULIC FRACTURING METHODS UTILIZING COKE PROPPANT PARTICLES," and co-pending and commonly-assigned U.S. patent application Ser. No. 18/417,483, filed Jan. 19, 2024, titled "METHODS FOR PRODUCING HYDROCARBON FLUIDS WITH REDUCED WATER-OIL RATIO BY UTILIZING OIL-WET PETROLEUM COKE PROPPANT PARTICLES DURING HYDRAULIC FRACTURING," the contents of all of which are incorporated by reference herein in their entirety.

FIELD

This disclosure relates generally to the field of hydraulic fracturing operations and the fracturing fluids and proppant particles employed therein. More specifically, this disclosure relates to hydraulic fracturing processes for sequentially introducing multiple differing proppant-containing fracturing fluids into subterranean formations.

BACKGROUND

This section is intended to introduce various aspects of the art, which may be associated with aspects and embodiments of the present disclosure. This discussion is believed to assist in providing a framework to facilitate a better understanding of particular aspects and embodiments of the present disclosure. Accordingly, it should be understood that this section should be read in this light, and not necessarily as admissions of prior art.

A wellbore can be drilled into a subterranean formation to promote the removal (or production) of a resource, such as hydrocarbon fluids, coal, minerals, water, or the like. In many cases, the subterranean formation needs to be stimulated in some manner to promote the removal of the resource. Stimulation can include any operation performed upon the matrix of a subterranean formation to improve fluid conductivity therethrough, including hydraulic fracturing, which is commonly used for unconventional reservoirs.

Hydraulic fracturing typically involves the pumping of large quantities of fracturing fluid into a subterranean formation (e.g., a low-permeability formation) under high hydraulic pressure to promote the formation of one or more fractures within the matrix of the formation and to create high-conductivity flow paths. Primary fractures extending from the wellbore and, in some instances, secondary fractures extending from the primary fractures are formed during a fracturing operation. These fractures may be vertical, horizontal, or a combination of directions forming a tortuous path.

Proppant particles are often included in the fracturing fluid. Once the fracturing fluid has been pumped into the subterranean formation, it is desired that such proppant particles could be transported into the fractures and settle therein. Upon pressure release, the proppant particles remaining in the fractures keep the fractures open by preventing them from collapsing, facilitating the flow of the desired resource from the fractured formations into the wellbore through the propped fractures due to its improved permeability and conductivity when compared to that of the unconventional formation matrix. The performance of the proppant can affect the recovery of the intended resource significantly.

Sand has been traditionally used as a proppant in hydraulic fracturing for the production of hydrocarbon fluids from unconventional formations due to its shape, mechanical properties, and easy availability with limited processing. Various other types of proppants have been proposed and available to substitute sand, such as ceramics and polymers. Nonetheless, all these existing proppants suffer from one of more drawbacks, such as high cost and limited hydrocarbon recovery rate. Thus, there is a genuine need of high-performance proppants, hydraulic fracturing fluids, and hydraulic fracturing methods in the industry. This disclosure satisfies these and other needs.

SUMMARY

An aspect of the present disclosure provides a hydraulic fracturing process. The process comprises, during a time interval T1, pumping a first fracturing fluid comprising first coke proppant particles into a subterranean formation, such that a first weight of the first coke proppant particles, WCP1, is pumped into the subterranean formation. The process also comprises, during a time interval T2 that occurs before or after T1, pumping a second fracturing fluid differing from the first fracturing fluid and comprising non-coke proppant particles and optionally second coke proppant particles into the subterranean formation, such that a second weight of the second coke proppant particles, if any, WCP2, is pumped into the subterranean formation, where $WCP1/WCP2 \geq 1.2$.

Another aspect of the present disclosure provides another hydraulic fracturing process. The process includes, during a time interval T1, pumping a first fracturing fluid comprising first coke proppant particles into a subterranean formation, such that a first weight of the first coke proppant particles, WCP1, and a total weight of proppant particles, WTP1, are pumped into the subterranean formation. The process also comprises, during a time interval T2 that occurs before or after the time interval T1, pumping a second fracturing fluid comprising non-coke proppant particles and optionally second coke proppant particles into the subterranean formation, such that a second weight of the second coke proppant particles, if any, WCP2, and a total weight of proppant particles, WTP2, are pumped into the subterranean formation, where $WCP1/WCP2 \geq 1.1$ and $WCP1/(WTP1+WTP2) \leq 0.5$.

These and other features and attributes of the disclosed aspects and embodiments of the present disclosure and their advantageous applications and/or uses will be apparent from the detailed description that follows.

BRIEF DESCRIPTION OF THE DRAWINGS

To assist those of ordinary skill in the relevant art in making and using the subject matter described herein, reference is made to the appended drawings, where:

FIG. 11 is a process flow diagram of an exemplary hydraulically fracturing process for sequentially introducing multiple fracturing fluids with differing compositions into a subterranean formation; and FIG. 12 is a process flow diagram of another exemplary hydraulically fracturing process for sequentially introducing multiple fracturing fluids with differing compositions into a subterranean formation.

Figure 1:
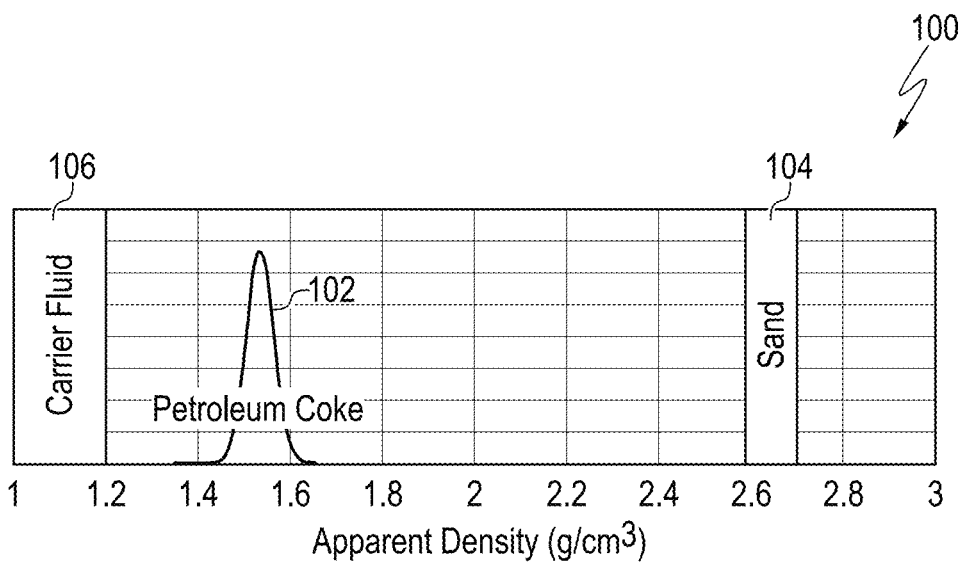
FIG. 1 is a graph comparing the apparent densities of petroleum coke particles within a petroleum coke sample to the apparent densities of sand particles within a sand sample.

It should be noted that the figures are merely examples of the present disclosure and are not intended to impose limitations on the scope of the present disclosure. Further, the figures are generally not drawn to scale, but are drafted for purposes of convenience and clarity in illustrating various aspects of the present disclosure.

DETAILED DESCRIPTION

In the following detailed description section, the specific examples of the present disclosure are described in connection with preferred aspects and embodiments. However, to the extent that the following description is specific to one or more aspects or embodiments of the present disclosure, this is intended to be for exemplary purposes only and simply provides a description of such aspect(s) or embodiment(s). Accordingly, the present disclosure is not limited to the specific aspects and embodiments described below, but rather, includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition those skilled in the art have given that term as reflected in at least one printed publication or issued patent. Further, the present disclosure is not limited by the usage of the terms shown below, as all equivalents, synonyms, new developments, and terms or processes that serve the same or a similar purpose are considered to be within the scope of the present claims.

As used herein, the singular forms "a," "an," and "the" mean one or more when applied to any embodiment described herein. The use of "a," "an," and/or "the" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., ±%, ±5%, ±10%, ±15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

As used herein, the term "apparent density," with reference to the density of proppant particles, refers to the density of the individual particles themselves, which may be expressed in grams per cubic centimeter (g/cm³ or g/cc). The apparent density values provided herein are based on the American Petroleum Institute's Recommended Practice 19C (hereinafter "API RP-19C") standard, entitled "Measurement of Properties of Proppants Used in Hydraulic Fracturing and Gravel-packing Operations" (First Ed. May 2008, Reaffirmed June 2016).

The phrase "at least one," when used in reference to a list of one or more entities (or elements), should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the term "blast furnace coke" refers to any coal-derived coke suitable for use in a blast furnace for making steel.

As used herein, the term "crush strength," when used with reference to proppant particles, refers to the uniaxial stress (compressive) load that the proppant particles can withstand prior to crushing (e.g., breaking or cracking). The crush strength values of the present disclosure are based on API RP-19C.

As used herein, the terms "example," exemplary," and "embodiment," when used with reference to one or more components, features, structures, or methods according to the present disclosure, are intended to convey that the described component, feature, structure, or method is an illustrative, non-exclusive example of components, features, structures, or methods according to the present disclosure. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present disclosure.

As used herein, the term "flexicoke" refers to the solid concentrated carbon material produced via the FLEXICOK-ING™ process, which is a thermal cracking process utilizing fluidized solids and gasification for the conversion of heavy, low-grade hydrocarbon feeds into lighter hydrocarbon products (e.g., upgraded, more valuable hydrocarbons). Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement, which is typically in a range from around 496° C. to around 538° C. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

Relatedly, the terms "wet flexicoke fines" and "dry flexicoke fines" refer to two byproducts of the FLEXICOK-ING™ process. Such byproducts are collected as particles that were not recovered in the secondary cyclones of the heater. More specifically, the particles are collected first in the tertiary cyclone as dry flexicoke fines, and the smaller particles that travel past the tertiary cyclone are then recovered in the venturi scrubber as wet flexicoke fines.

As used herein, the term "fluid coke" refers to the solid concentrated carbon material remaining from fluid coking. The term "fluid coking" refers to a thermal cracking process utilizing fluidized solids for the conversion of heavy, low-grade hydrocarbon feeds into lighter products (e.g., upgraded hydrocarbons), producing fluid coke as a byproduct. The fluid coking process differs from the FLEXICOK-ING™ process that produces the flexicoke in that the fluid coking process does not include a gasifier.

As used herein, the term "fly ash" refers to fine particles of ash, dust, and soot that generally consist primarily of silicon dioxide, aluminum oxide, and calcium oxide and are produced as a byproduct of the combustion of pulverized coal, typically within coal-fired electric and steam-generating plants.

The term "fracture" (or "hydraulic fracture") refers to a crack or surface of breakage within a subterranean formation, that can be induced by an applied pressure or stress.

As used herein, the term "hydraulic conductivity" refers to the ability of a fluid within a subterranean formation to pass through a fracture including proppant at various stress (or pressure) levels, which is based, at least in part, on the permeability of the proppant deposited within the hydraulic fractures. The hydraulic conductivity values provided herein are based on the American Petroleum Institute's Recommended Practice 19D (API RP-19D) standard, entitled "Measuring the Long-Term Conductivity of Proppants" (First Ed. May 2008, Reaffirmed May 2015).

The term "leading interval," when used herein with reference to an interval of a hydraulic fracturing operation, refers to an interval of the hydraulic fracturing operation that occurs first in time or, in other words, a first time interval. As a non-limiting example, a leading interval may constitute the first one-third (or approximately the first one-third) of the treatment for a particular stage.

As used herein, the term "metallurgical coke" refers to a type of coal-derived coke that is produced by heating coal, which causes fixed carbon to fuse to inherent ash and drives off a large percentage of the volatile matter. The resulting metallurgical coke particles include a range of different sizes, with the smallest particles being a fine powder (sometimes referred to as "coke breeze").

The term "particle size(s)," when used herein with reference to a type of particles," refers to the diameter(s) of such particle(s). The term "particle size distribution," when used herein with reference to a type or a collection of particles, refers to the range of diameters for such particles, typically from the minimal to the maximal. The terms "average particle size distribution" and "D50" when used herein with reference to a type or a collection of particles, interchangeably mean the median particle size of the particles.

The term "petroleum coke" refers to a final carbon-rich solid material that is derived from oil refining. More specifically, petroleum coke is the carbonization product of high-boiling hydrocarbon fractions that are obtained as a result of petroleum processing operations. Petroleum coke is produced within a coking unit via a thermal cracking process in which long-chain hydrocarbons are split into shorter-chain hydrocarbons. As described herein, there are at least three main types of petroleum coke: delayed coke, fluid coke, and flexicoke. Each type of petroleum coke is produced using a different coking process; however, all three coking processes have the common objective of maximizing the yield of distillate products within a refinery by rejecting large quantities of carbon in the residue as petroleum coke.

The term "coal-derived coke" means any coke prepared from coal by, e.g., thermal treatment.

As used herein, the terms "proppant" and "proppant particle" refer to a solid material capable of maintaining open an induced fracture during and following a hydraulic fracturing treatment. The term "proppant pack" refers to a collection of proppant particles.

The terms "coke proppant" and "coke proppant particles" refer to a proppant based on or derived from a solid carbonaceous material produced from treating a carbon-containing material (e.g., oil (e.g., crude oil, vacuum pipestill, and the like), coal, and hydrocarbons) at an elevated temperature in an oxygen deficient environment. The elevated temperature can be at least 200, 250, 300, 350; 400, 450, 500, 600, 700, 800, 900, or even 1000° C. The carbonaceous material comprises the carbon element and optionally additional elements including but not limited to hydrogen, sulfur, vanadium, iron, and the like. The carbonaceous material preferably comprises the carbon element at a concentration of ≥50 wt %, e.g., from 50, 55, 60, 65, 70, wt %, to 75, 80, 85, 90, 95 wt %, to 96, 97, 98, 99 wt %, or even 100 wt %, based on the total weight of all elements in the carbonaceous material. The carbonaceous material preferably comprises the carbon element and hydrogen element at a combined concentration of ≥55 wt %, e.g., from 55, 60, 65, 70, wt %, to 75, 80, 85, 90, 95 wt %, to 96, 97, 98, 99 wt %, or even 100 wt %, based on the total weight of all elements in the carbonaceous material.

The term "non-coke proppant" means any proppant that does not comprise coke proppant particles.

Examples of non-coke proppant include sand, ceramic proppants, glass proppants, and polymer proppants.

The term "lightweight proppant (LWP)" refers to proppants having an apparent density within a range of from around 1.2 g/cm³ to around 2.2 g/cm³ (e.g., from around 1.2, 1.3, 1.4, 1.5, 1.6 g/cm³ to around 1.7, 1.8, 1.9, 2.0, 2.1, 2.2 g/cm³), while the term "ultra-lightweight proppant (ULWP)" refers to proppants having an apparent density within a range from around 0.5 g/cm³ to around 1.2 g/cm³ (e.g., from around 0.5, 0.6, 0.7, 0.8 g/cm³ to around 0.9, 1.0, 1.1, 1.2 g/cm³). A coke proppant may or may not be an LWP. The term "non-LWP proppant" refers to proppants having apparent density higher than 2.2 g/cm³ (e.g., from around 2.3, 2.4, 2.5 to around 2.6, 2.8, 3.0, to 3.2, 3.4, 3.5 g/cm³.) A non-coke proppant may or may not be a non-LWP.

The term "microproppant" means proppant particles having particle sizes of at most 105 μm (140 mesh). The term "microproppant coke particles" means a collection of coke particles having particle sizes of at most 105 μm, but potentially within a range from around 0.0001 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm).

The term "petroleum coke proppant particles" means a collection of coke proppant particles that are derived from a petroleum coke source material. The term "petroleum coke fines" means a collection of microproppant coke particles that are derived from a petroleum source material.

As used herein, the term "pyrolysis coke" refers to a type of coke that is generated via hydrocarbon pyrolysis at pyrolysis temperatures higher than the coking processes for making petroleum coke.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The term "substantially free" or "essentially free" when used with reference to a component of a composition, interchangeably means that the composition comprises the component at a concentration of ≤10 wt %, ≤5 wt %, ≤3 wt %, ≤1 wt %, or 0 wt %, based on the total weight of the composition, depending on the details of the particular implementation.

As used herein, the term "thermally post-treated coke" refers to petroleum coke that has been heated to temperatures in a range from around 400° C. to 1200° C. (e.g., from around 400, 500, 600° C., to 700, 800, 900° C., to 1000, 1100, 1200° C.) for a predetermined duration that is in a range from around 1 minute to around 24 hours (e.g., from around 1 minute, 30 minutes, 1 hour to 4 hours, 8 hours, 12 hours to 16 hours, 20 hours, 24 hours).

The term "wellbore" refers to a borehole drilled into a subterranean formation. The borehole may include vertical, deviated, highly deviated, and/or lateral sections. The term "wellbore" also includes the downhole equipment associated with the borehole, such as the casing strings, production tubing, gas lift valves, and other subsurface equipment. Relatedly, the term "hydrocarbon well" (or simply "well") includes the wellbore in addition to the wellhead and other associated surface equipment.

Certain embodiments and features are described herein using a set of numerical upper limits and a set of numerical lower limits. It should be appreciated that ranges from any lower limit to any upper limit are contemplated unless otherwise indicated. All numerical values are "about", "around," or "approximately" the indicated value, and account for experimental errors and variations that would be expected by a person having ordinary skill in the art.

Furthermore, concentrations, dimensions, amounts, and/or other numerical data that are presented in a range format are to be interpreted flexibly to include not only the numerical values explicitly recited as the limits of the range, but also all individual numerical values or sub-ranges encompassed within that range, as if each numerical value and sub-range were explicitly recited. For example, a disclosed numerical range of 1 to 200 should be interpreted to include, not only the explicitly-recited limits of 1 and 200, but also individual values, such as 2, 3, 4, 197, 198, 199, etc., as well as sub-ranges, such as 10 to 50, 20 to 100, etc.

During the drilling of a hydrocarbon well, a wellbore is formed within a subterranean formation using a drill bit that may be advanced at the lower end of a drill string until it reaches a predetermined location in the subsurface. The drill string and bit may then be removed, and the wellbore may be lined with steel tubulars, commonly referred to as casing strings. An annulus may thus be formed between the casing strings and the surrounding subterranean formation. A cementing operation may be conducted to fill the annulus with columns of cement. The combination of the casing strings and the cement strengthens the wellbore and isolates or impedes fluid flow and pressure transmissibility along the annulus.

It is common to place several casing strings having progressively-smaller outer diameters into the wellbore. The first casing string may be referred to as the "surface casing string." The surface casing string serves to isolate and protect the shallower, freshwater-bearing aquifers from contamination by any other wellbore fluids. Accordingly, this casing string may be cemented entirely back to the surface.

A process of drilling and then cementing progressively-smaller casing strings may be repeated several times below the surface casing string until the hydrocarbon well has reached total depth. The final casing string, referred to as the "production casing string," may extend through a hydrocarbon-bearing interval (referred to as a "reservoir") in the subterranean formation. In some instances, the production casing string is a production liner, that is, a casing string that is not tied back to the surface. The production casing string may also be cemented into place. In some completions, the production casing string has swell packers or plugs spaced across selected productive intervals. This creates compartments between the packers for isolation of stages and specific stimulation treatments. In this instance, the annulus may simply be packed with sand.

As part of the completion process, a section of the wellbore (referred to as a "stage") may be isolated through the setting of a packer or plug. The production casing string may then be perforated at one or more desired intervals uphole of the plug, meaning that clusters of perforations are created through the production casing string and the cement column surrounding the production casing string using a perforating gun. In operation, the perforating gun may form one perforation cluster by shooting a number of perforations in close proximity, such as, for example, 12 to 18 perforations at one time, over a 1 foot (ft) (0.3 meter (m)) to 3 ft (3 m) region, for example, with each perforation potentially being approximately 0.3 inches (in) (0.8 centimeters (cm)) to 0.5 in (1.3 cm) in diameter, for example. The perforating gun may then be moved uphole around 10 ft (3 m) to 100 ft (30 m), for example, and a second perforating gun may be used to form a second perforation cluster. This process of forming perforation clusters may be repeated to create additional perforation clusters within each stage of the hydrocarbon well. The resulting perforation clusters may allow hydrocarbon fluids from the surrounding subterranean formation to flow into the hydrocarbon well. Note that in some instances, however, the production casing string is instead provided as a sliding sleeve tubular or other type of casing string with pre-formed perforation clusters. In such instances, the preformed perforations may be initially closed but can be opened through various forms of actuation to control fluid flow through the perforations.

After the perforation process is complete, the subterranean formation may be hydraulically fractured at each stage of the wellbore to increase the productivity of the subterranean formation. Hydraulic fracturing consists of injecting a volume of fracturing fluid through the created perforations and into the surrounding subterranean formation at such high pressures and rates that the subsurface rock in proximity to the perforations cracks open and resulting hydraulic fractures extend outwardly into the subterranean formation in proportion to the injected fluid volume. Ideally, a separate hydraulic fracture emanates outwardly from each perforation cluster, forming a set of hydraulic fractures, commonly referred to as a "fracture network." Ideally, this fracture network includes a sequence of parallel fracture planes, thereby creating as much fracturing of the subsurface rock as possible. Near the wellbore, a complex topology of hydraulic fractures may sometimes result from the breakdown of perforations within each perforation cluster, but it is common to assume that these hydraulic fractures ultimately link up to form a single dominant fracture plane that is hydraulically connected to the wellbore. In operation, to create the hydraulic fracture, the injection pressure of the fracturing fluid must exceed the hydraulic pressure in the subterranean formation plus the strength of the rock, and often even exceeds the lithostatic pressure in the subterranean formation.

Hydraulic fracturing is used most extensively for increasing the productivity of "unconventional" (or "tight") subterranean formations, which are subterranean formations with very low permeability that typically do not produce economically without hydraulic fracturing. Examples of unconventional subterranean formations include tight sandstone formations, tight carbonate formations, shale gas formations, coal bed methane formations, and tight oil formations. During the hydraulic fracturing of such subterranean formations, the pump rate (or injection rate) of the fracturing fluid may be increased until it reaches a maximum pump rate of around 20 barrels per minute (bbl/min) (0.05 cubic meters per second $(m^3/s)$) to around 150 bbl/min (0.41 $m^3/s$) (e.g., 20, 60, 90 bbl/min, to 120, 150 bbl/min). In operation, around 5,000 barrels to around 15,000 barrels (e.g., 5,000, 6,000, 7,000, 8,000 barrels, to 9,000, 10,000, 11,000, 12,000 barrels, to 13,000, 14,000, 15,000 barrels) of fracturing fluid may be injected for each stage of the hydrocarbon well, for example.

In operation, a small portion (e.g., often around 5% to around 10%) of the fracturing fluid may be pumped into the wellbore during a pad phase of the hydraulic fracturing operation for each stage. The pad phase is designed to initiate hydraulic fractures and grow the hydraulic fractures to a certain size and volume to accommodate the injection of a proppant. The remaining portion of the fracturing fluid may then be mixed with the proppant and pumped into the wellbore and through the perforations into the stimulated reservoir volume (SRV). The proppant serves to hold the hydraulic fractures open after the hydraulic pressure is released. Ideally, the resulting hydraulic fractures grow to be hundreds of feet radially from the wellbore into the subterranean formation. In the case of unconventional subterranean formations, the combination of hydraulic fractures and injected proppant substantially increases the flow capacity of the treated formation.

This application of hydraulic fracturing is a routine part of petroleum industry operations as applied to individual subterranean formations. Such subterranean formations may represent hundreds of feet of gross, vertical thickness of subterranean formation. More recently, hydrocarbon wells are being completed through formations laterally, with the lateral sections often extending at least 1,000 feet (304 meters), in which case the hydrocarbon well may be referred to as an "extended-reach lateral well," or, in some cases, at least 10,000 feet (3048 meters), in which case the hydrocarbon well may be referred to as an "ultra-extended-reach lateral well."

When there are multiple-layered or very thick formations to be hydraulically fractured, or where an extended-reach or ultra-extended-reach lateral well is being completed, then more complex treatment techniques may be utilized to obtain treatment of the entire target area. Therefore, the operating company may isolate the various stages (as described above) to ensure that each separate stage is not only perforated, but also adequately fractured and treated. In this way, the operator may be sure that fracturing fluid is being injected through each perforation cluster and into each stage of interest to effectively increase the flow capacity at each desired depth and lateral location.

Treatment of a stage of interest may involve isolating the stage from all stages that have already been treated. This may involve the use of so-called diversion methods, in which injected fracturing fluid is directed towards one selected stage of interest while being diverted from other stages. In many cases, frac plugs are set between stages and are used to prevent injected fluid from entering stages that have already been fractured and propped.

This hydraulic fracturing process may be repeated for every stage in the hydrocarbon well. In the case of wells including lateral sections, the first stage is typically located near the end (or "toe") of the lateral section, and the last stage is typically located near the beginning (or "heel") of the lateral section. For extended-reach lateral wells, there may be around 20 to around 50 individual stages, for example. For ultra-extended-reach lateral wells, there may be more than 100 stages, for example.

After the hydraulic fracturing process is complete, the frac plugs (and/or other diversion materials) may be drilled out of the hydrocarbon well. The hydrocarbon well may then be brought on production, meaning that it may be used to recover hydrocarbon fluids from the subterranean formation. In operation, the pressure differential between the formation and the hydrocarbon well may be used to force hydrocarbon fluids to flow through the hydraulic fractures within the formation and into the production casing string via the corresponding perforation clusters. The hydrocarbon fluids then flow up the hydrocarbon well to the surface.

In operation, the success of the hydraulic fracturing process has a direct impact on the ultimate production performance of the hydrocarbon well. Specifically, the numbers, sizes, compliances, and locations of the hydraulic fractures corresponding to the perforation clusters within each stage of the hydrocarbon well directly impact the amount of hydrocarbon fluids that are able to mobilize and flow into the hydrocarbon well. However, the success of the hydraulic fracturing process is limited by the ability of the fracturing fluid to penetrate deeply into the formation, thus enabling the proppant to deposit within extended regions of the hydraulic fractures.

According to conventional techniques, sand is often used as the proppant within the fracturing fluid. However, sand tends to settle out of the fracturing fluid relatively quickly, thus limiting the effectiveness of the hydraulic fracturing operation. To mitigate the low transport capacity of sand, highly-viscous carrier fluids are often utilized along with sand to enable the sand to stay suspended within the fracturing fluid for longer periods of time and, therefore, to penetrate deeper into the formation. Slickwater includes added friction reducers, such as high-molecular-weight polyacrylamides, for example, that are designed to reduce the turbulent friction in the wellbore and through the fracture to allow higher injection rates with lower pumping pressures. However, the friction reducers and/or other viscosity-enhancing additives within the slickwater are costly and often cause formation damage, thus reducing the conductivity of the resulting hydraulic fractures. Moreover, even with the utilization of such friction reducers, sand still tends to settle out of the fracturing fluid relatively quickly.

Therefore, the present disclosure alleviates the foregoing difficulty and provides related advantages as well. We have found, in a surprising and totally counterintuitive manner, that the pumping of LWP particles and/or coke proppant particles in the manner of sequential injection (e.g., the injection of LWP particles in a fracturing fluid followed by injection of non-LWP particles such as sand in another fracturing fluid within any given stage, or the injection of coke proppant particles in a fracturing fluid followed by non-coke proppant particles such as sand in another fracturing fluid within any given stage) has been shown to be advantageous over pumping LWP particles and/or coke proppant particles blended with conventional sands. Laboratory flow tests show that when LWP or coke particles are pumped with sand in a blended scenario, the LWP or coke proppant particles tend to be dragged down by the sand, resulting in less overall propped areas created by LWP or coke proppant particles due to the limited amount of LWP/coke proppant particles being able to travel the full distance in the fracture. When LWP and/or coke proppant particles are injected separately from sand, most LWP/coke proppant particles are able to travel to the tip of the fracture throughout injection, thus creating a significantly more propped area than the case of blending LWP with sand. Modeling work also validates the lab flow tests by simulating larger propped areas when injecting LWP/coke proppant particles sequentially rather than blended with sand.

Thus, the present disclosure provides for the hydraulic fracturing of subterranean formations via hydrocarbon wells by sequentially pumping multiple fracturing fluids comprising (i) differing concentrations of LWP particles and non-LWP particles and/or (ii) differing concentrations of coke proppant particles and non-coke proppant particles during the hydraulic fracturing operation. More specifically, according to the present disclosure, a fracturing fluid comprising LWP particles and/or coke proppant particles is pumped at one or more time intervals during the hydraulic fracturing operation, and another fracturing fluid comprising non-LWP particles and/or non-coke proppant particles and, optionally, other LWP particles and/or other coke proppant particles is pumped at one or more other time intervals during the hydraulic fracturing operation. As described further herein, such sequential pumping of multiple fracturing fluids with differing compositions may lead to the creation of larger conductive fractures within the formation, thus providing substantial production uplift for the corresponding well. While the following description focuses on aspects and embodiments utilizing coke proppant particles and non-coke proppant particles, the same is generally applicable to aspects and embodiments utilizing LWP proppant particles and non-LWP proppant particles. In certain embodiments, the LWP proppant particles may comprise, consist essentially of, or consist of coke proppant particles, and the non-LWP proppant particles may comprise, consist essentially of, or consist of non-coke proppant particles.

In some embodiments, around 10 vol % to around 67 vol % (e.g., 10, 20, 30 vol %, to 40, 50, 60, 67 vol %), on a dry particle basis, of the total proppant particles pumped per stage may be coke proppant particles and/or LWP particles, based on the total volume of all proppant particles pumped during the stage. In some such embodiments, around 15 vol % of the total proppant particles pumped per stage are coke proppant particles and/or LWP particles. In other such embodiments, around 33 vol % of the total proppant particles pumped per stage are coke proppant particles. In other such embodiments, around 50 vol % of the total proppant particles pumped per stage are coke proppant particles. Moreover, in other such embodiments, around 67 vol % of the total proppant particles pumped per stage are coke proppant particles.

As described further herein, the coke proppant particles may include any suitable types of coke, such as, for example, fluid coke, flexicoke, delayed coke, thermally post-treated coke, pyrolysis coke, and/or coal-derived coke. Moreover, in some embodiments, at least a portion of such coke proppant particles are provided as microproppant coke particles.

With regard to petroleum coke specifically, petroleum coke particles include a number of properties and features that alleviate difficulties that are typically encountered during the hydraulic fracturing of subterranean formations via hydrocarbon wells. First, the lower-density nature of petroleum coke enables petroleum coke proppant particles to transport further within the wellbore and the corresponding hydraulic fractures as compared to non-coke proppant particles. In addition, petroleum coke proppant particles have been shown to be less prone than non-coke proppant particles to flow back into the wellbore once the hydraulic fracturing operation is complete and the hydrocarbon well is brought on production. Moreover, petroleum coke proppant particles are expected to be less prone than non-coke proppant particles to settle around any diversion materials within the wellbore, thus enabling dissolvable, biodegradable, or self-destructible diversion materials (such as dissolvable plugs, for example) to be effectively used within the wellbore. Furthermore, the utilization of petroleum coke proppant particles reduces the likelihood of cluster-level screenout as compared to the utilization of non-coke proppant particles. Each of these factors may advantageously reduce or eliminate the need to perform a wellbore cleanout procedure.

Moreover, the lower-density nature of petroleum coke particles enables petroleum coke proppant particles to transport further within each stage and further throughout the perforation clusters as compared to non-coke proppant particles. As a result, fracturing fluids including petroleum coke proppant particles will more evenly and efficiently flow throughout the stages and into the perforation clusters and, therefore, also more efficiently travel into the tips (or at least within proximity to the tips) of the formed hydraulic fractures.

As described herein, petroleum coke has sufficient crush strength to maintain propped fractures upon the removal of hydraulic pressure and to maintain efficient conductivity once the wellbore is brought on production. In addition, the relatively low density of petroleum coke may decrease or eliminate the need to use gelled fracturing fluids, thereby avoiding the costs associated with gelation. Furthermore, using petroleum coke may potentially reduce required injection pressures, reduce overall water consumption, and avoid the need for frequent wellbore cleanouts.

Effective proppant particles are typically associated with a variety of particular characteristics or properties, including efficient proppant particle transport within a carrier fluid, sufficient strength to maintain propped fractures upon the removal of hydraulic pressure, and efficient conductivity once the wellbore is brought on production. With respect to the proppant particle transport properties, the settling rate of a proppant particle within a fracturing fluid at least in part determines its transport capacity within a hydraulic fracture. The settling rate of a proppant particle can be determined using Equation (1).

$$v = \frac{\rho_p - \rho_f}{18\eta} g\sigma^2, \tag{1}$$

In Equation (1), v is the proppant particle, $\rho_p - \rho_f$ is proportional to the density difference between the proppant particle and the carrier fluid, $\eta$ is the viscosity of the carrier fluid, g is the gravitational constant, and $\sigma^2$ is proportional to the square of the proppant particle size. As will be appreciated, proppant particles having lower apparent densities and/or smaller particle sizes settle at a slower rate within an identical carrier fluid (thus having better transport) compared to higher apparent density and/or larger particle sized proppant particles.

Figure 2:
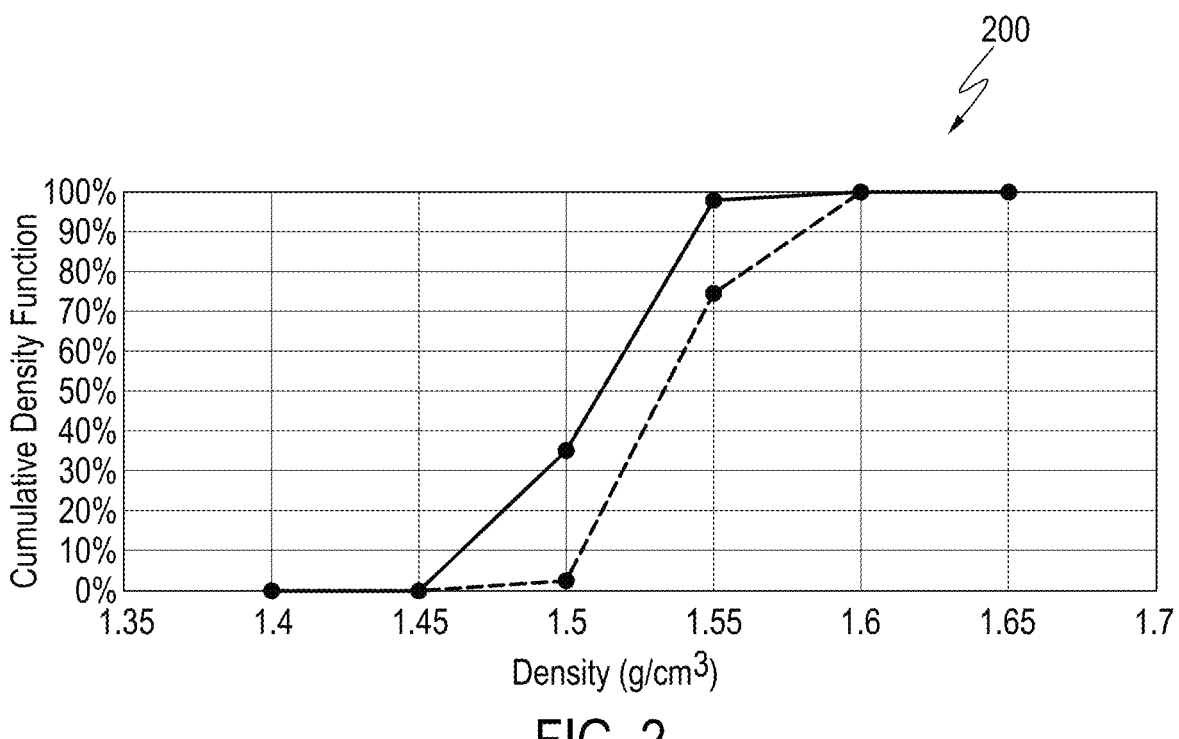
FIG. 2 is a graph showing cumulative density functions for fluid coke particles within two fluid coke samples.

Petroleum coke is therefore particularly well-suited for utilization as a proppant during hydraulic fracturing operations due at least in part to the relatively low apparent densities of petroleum coke particles as compared to non-coke proppants (e.g., sand). This is illustrated by FIG. 1, which is a graph 100 comparing the apparent densities of petroleum coke particles within a petroleum coke sample to the apparent densities of sand particles within a sand sample. Specifically, the apparent densities of the petroleum coke particles (i.e., in this example, fluid coke particles) and the sand particles were determined in the laboratory by measuring the mass of each type of particle that settled in a given density of brine. Based on these measurements, the apparent densities of the petroleum coke particles ranged from around 1.3 g/cm³ to around 1.7 g/cm³, as shown at 102, while the apparent densities of the sand particles ranged from around 2.6 g/cm³ to around 2.7 g/cm³, as shown at 104. Therefore, the apparent density of petroleum coke is significantly lower than the apparent density of sand. Moreover, the apparent density of typical carrier fluid (e.g., water) generally ranges from around 1.0 g/cm³ to around 1.2 g/cm³, as shown at 106. Moreover, FIG. 2 is a graph 200 showing cumulative density functions for fluid coke particles within two fluid coke samples. As shown, the densities of the fluid coke particles ranged from around 1.4 g/cm³ to around 1.65 g/cm³.

Figures 3, 4:
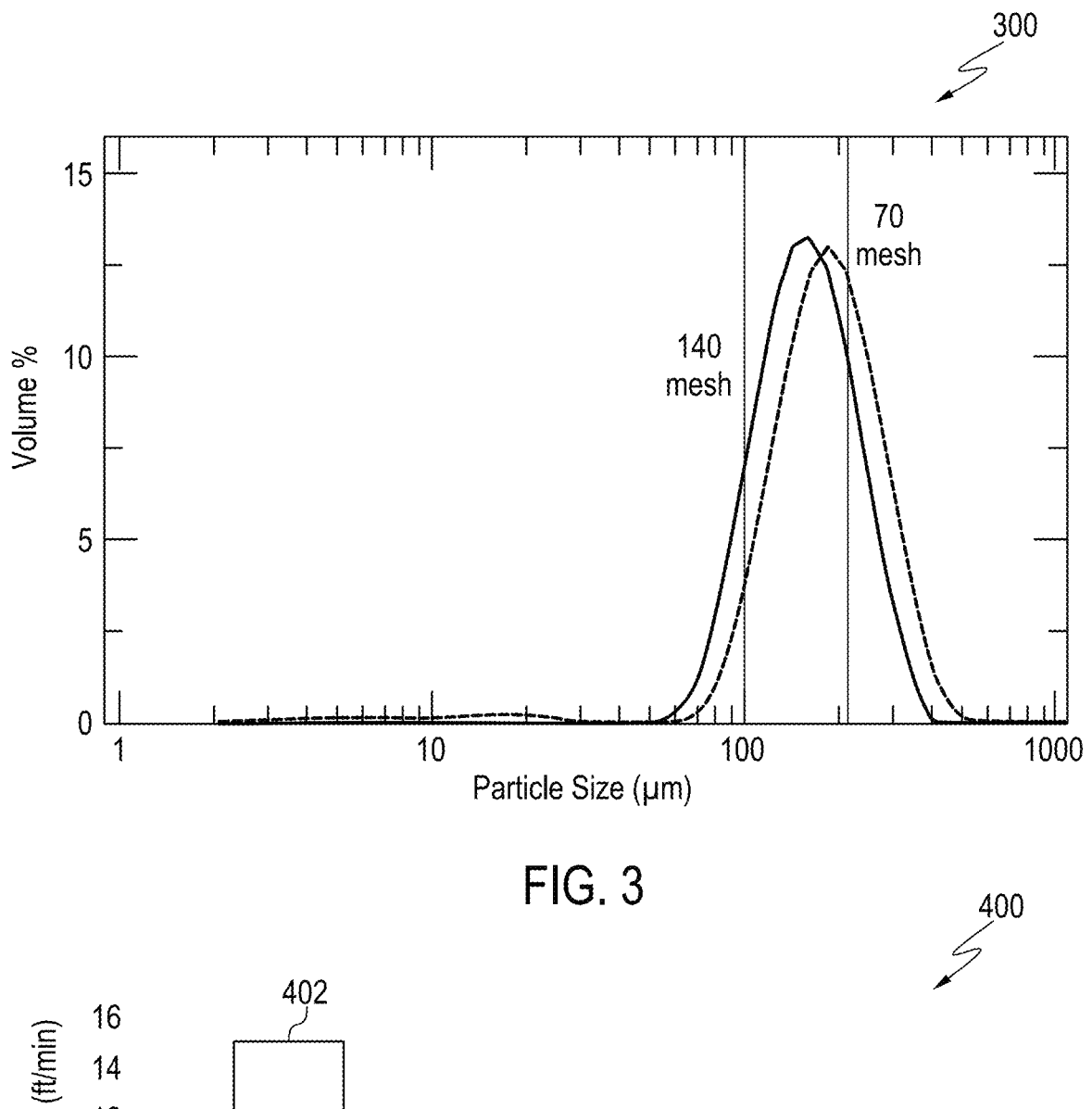
FIG. 3 is a graph showing particle size distributions for fluid coke particles within two fluid coke samples.
FIG. 4 is a bar graph showing the terminal settling velocities in recycled water for sand particles within a 40/70-mesh sand sample, sand particles within a 100-mesh sand sample, and fluid coke particles within a 100-mesh fluid coke sample.

The transport properties of petroleum coke proppant particles are further enhanced by the differentiated size distribution of such particles. Specifically, while the particle sizes of sand generally ranges from around 105 microns (μm) to around 850 μm (i.e., around 140 mesh to around 20 mesh), the particle size of petroleum coke can be varied such that it either approximates the particle size of sand or is provided with smaller particle sizes. As an example, FIG. 3 is a graph 300 showing particle size distributions for fluid coke particles within two fluid coke samples. As shown, the particle sizes for the two fluid coke samples were from around 100 μm to around 210 μm (i.e., around 140 mesh to around 70 mesh), which encompasses the lower end of the range of typical particle sizes for different types of sand. Moreover, as described further herein, petroleum coke particles may also be provided with much smaller particle sizes via the utilization of microproppant coke particles, which may have particle sizes of at most 105 μm (140 mesh) or, in some cases, at most than 88 μm (170 mesh), but potentially within a range from around 0.0001 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm).

As described above with respect to Equation (1), because petroleum coke particles have lower apparent densities and similar or smaller particle sizes as compared to non-coke proppants (e.g., sand), such petroleum coke particles also have lower settling rates within the carrier fluid and, therefore, have enhanced transport properties as compared to sand. This is illustrated by FIG. 4, which is a bar graph 400 showing the terminal settling velocities in recycled water for sand particles within a 40/70-mesh sand sample, sand particles within a 100-mesh sand sample, and fluid coke particles within a 100-mesh fluid coke sample. In particular, the average terminal settling velocity for the sand particles within the 40/70-mesh sand sample was 6.9 feet per minute (ft/min) (0.04 meters per second (m/s)), as shown at 402; the average terminal settling velocity for the sand particles within the 100-mesh sand sample was 3.5 ft/min (0.02 m/s), as shown at 404; and the average terminal settling velocity for the fluid coke particles within the 100-mesh fluid coke sample was 0.6 ft/min (0.003 m/s), as shown at 406. Therefore, fluid coke particles (which are representative of other types of petroleum coke particles) will clearly transport further into hydraulic fractures than sand particles. As a result, proppants formed at least in part from petroleum coke are capable of propping extended regions of new and/or existing hydraulic fractures that would not be effectively propped by non-coke proppants, thus increasing the overall SRV in the subterranean formation and leading to increased production performance for the corresponding hydrocarbon well.

Figure 5:
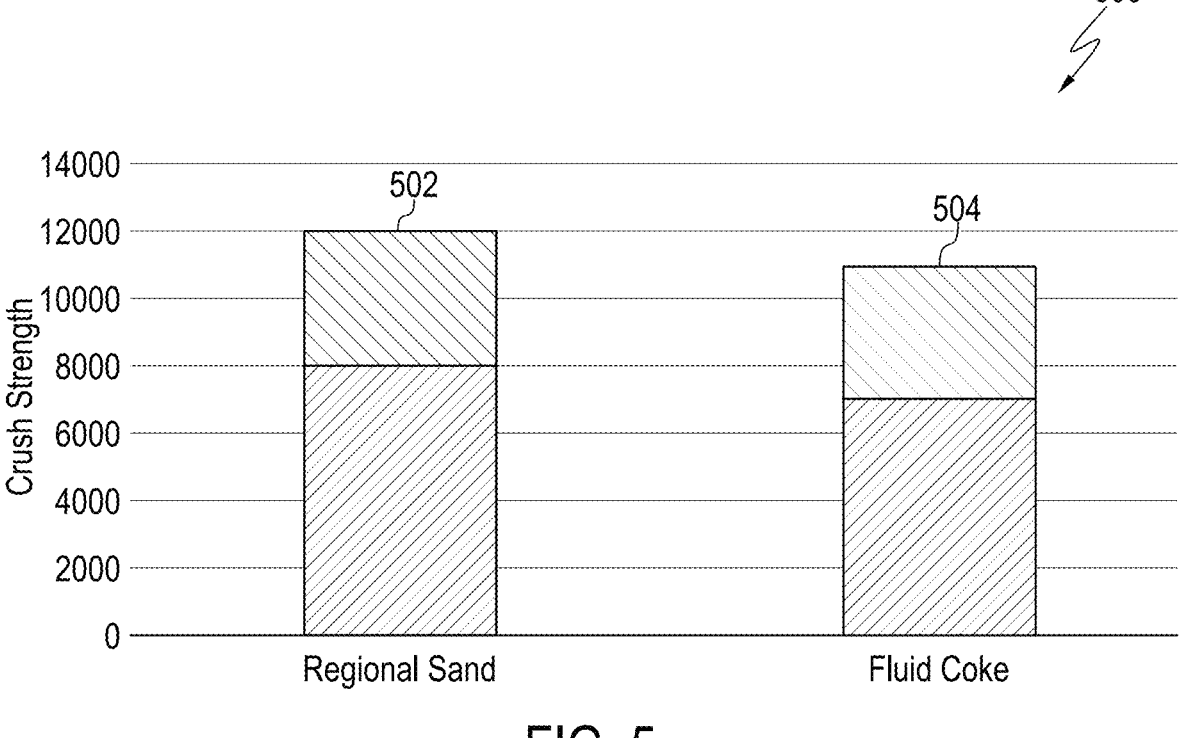
FIG. 5 is a bar graph comparing the crush strengths of sand particles within a regional sand sample to the crush strengths of fluid coke particles within a fluid coke sample.

Furthermore, the crush strength of a proppant particle is a measure of the particle's ability to withstand stresses within a hydraulic fracture, with efficient proppant particles being capable of resisting sustained loads within hydraulic fractures during the lifetime of the corresponding wellbore without comprising the hydraulic conductivity of such hydraulic fractures. As a result, proppant particles with higher crush strengths are favorable. According to API RP-19C standards, adequate proppant particles should have a crush strength indicating that less than 10% of fines are produced under a stress of 5,000 psi. In this regard, the crush strength of petroleum coke is advantageously comparable to the crush strength of sand. This is illustrated by FIG. 5, which is a bar graph 500 comparing the crush strengths of sand particles within a regional sand sample, as shown at 502, to the crush strengths of fluid coke particles within a fluid coke sample, as shown at 504. Such crush strength was determined according to API K crush strength testing by applying stress to the respective particles in increments of 1,000 psi until 10% fines were formed, with the crush strength of the particles within each sample being the pressure (in psi) at which 10% fines were formed. As shown in FIG. 5, the crush strength of fluid coke (which is representative of other types of petroleum coke) is comparable to the crush strength of regional sand.

With regard to the erosive properties of petroleum coke particles as compared to sand particles, it is noted that sand particles have a hardness of around 7 on the Mohs hardness scale, while petroleum coke particles have a hardness of less than around 6 on the Mohs hardness scale. Therefore, petroleum coke particles are expected to be less erosive than sand particles and are less likely to cause substantial erosion within the production causing string, including, in particular, the erosion of the perforation clusters.

Figure 6:
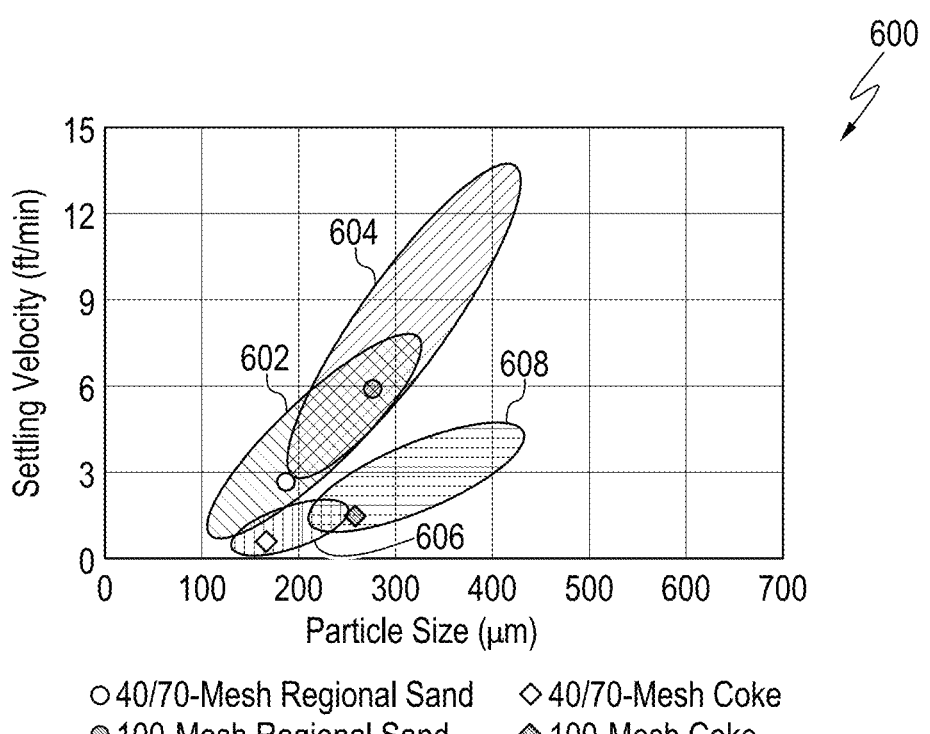
FIG. 6 is a graph showing settling velocity as a function of particle size for several different mesh sizes of sand and petroleum coke.

FIG. 6 is a graph 600 showing settling velocity as a function of particle size for several different mesh sizes of sand and petroleum coke. Specifically, the graph 600 shows settling velocity (in feet per minute (ft/min)) as a function of particle size (in μm) for 40/70-mesh regional sand (as represented by a first region 602), 100-mesh regional sand (as represented by a second region 604), 40/70-mesh petroleum coke (as represented by a third region 606), and 100-mesh petroleum coke (as represented by a fourth region 608), where the settling velocity value is based on a modified Stokes settling velocity. As illustrated by the graph 600, petroleum coke has a significantly lower settling rate (or velocity) than sand for comparable particle sizes. As a result, proppant particulates formed from petroleum coke material will perform better than proppant particulates formed from sand in terms of transport capacity within the fractures created during a hydraulic fracturing operation.

Figure 7:
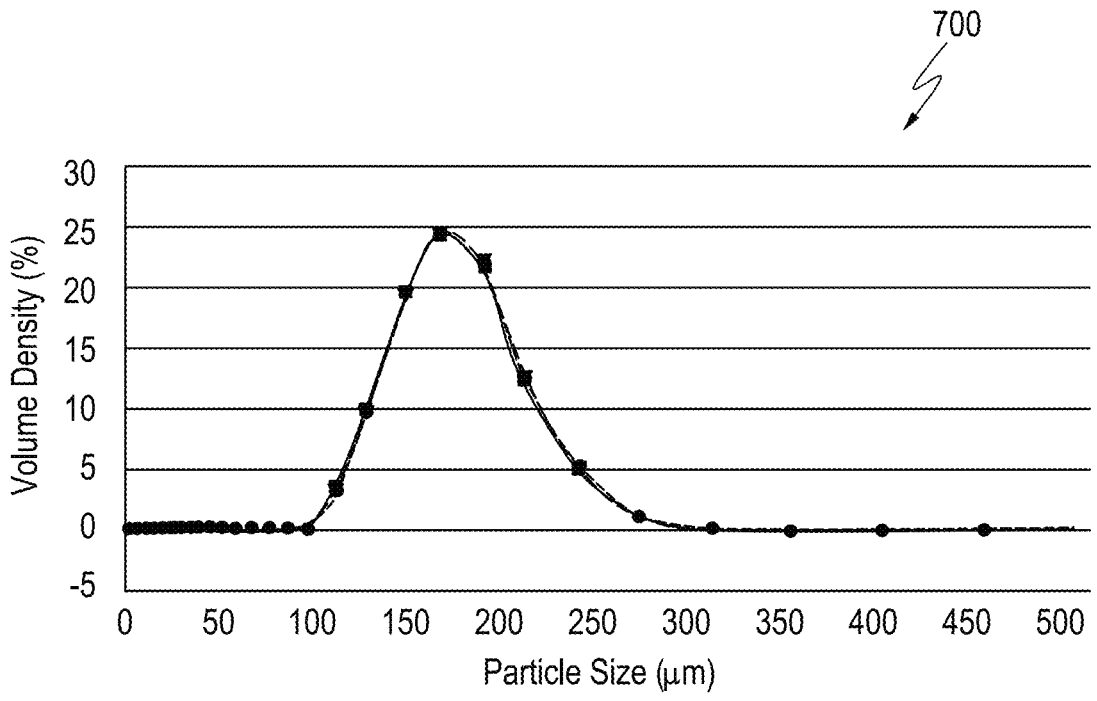
FIG. 7 is a graph showing a range of particle sizes for multiple fluid coke samples.

With regard to particle size, fluid coke particles and flexicoke particles are provided in a wide range of sizes. This is illustrated by FIG. 7, which is a graph 700 showing a range of particle sizes for multiple fluid coke samples. The particle sizes were measured using laser particle size analysis (LPSA), which is a rapid and precise optical sieve technique for particle size analysis that works on the principle of measuring the intensity of light scattered as a laser beam passes through a dispersed particulate sample. In this case, particles with sizes exceeding 3 millimeters (mm) were removed prior to the analysis. As shown in FIG. 7, the fluid coke samples exhibited a wide range of particle sizes upon exiting the reactor.

Figure 8:
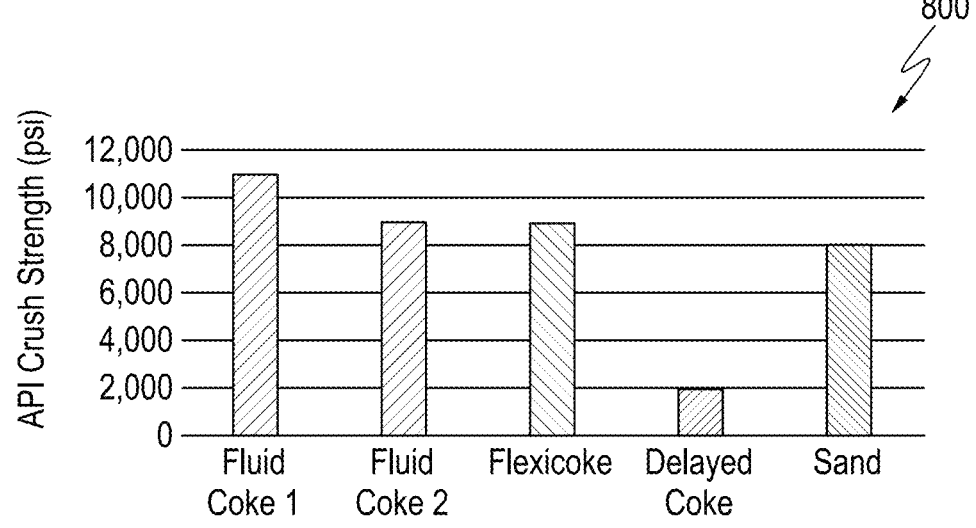
FIG. 8 is a bar graph comparing the crush strengths of different types of proppant.

In general, the crush strength of petroleum coke particles has been shown to range from around 8,000 psi to around 12,000 psi. This is illustrated, in part, by FIG. 8, which is a bar graph 800 comparing the crush strengths of different types of proppant. Specifically, FIG. 8 compares the crush strengths of two fluid coke sample, a flexicoke sample, a delayed coke sample, and a sand sample. As shown in the bar graph 800, the crush strengths of fluid coke and flexicoke approximate the crush strength of sand.

Figure 9:
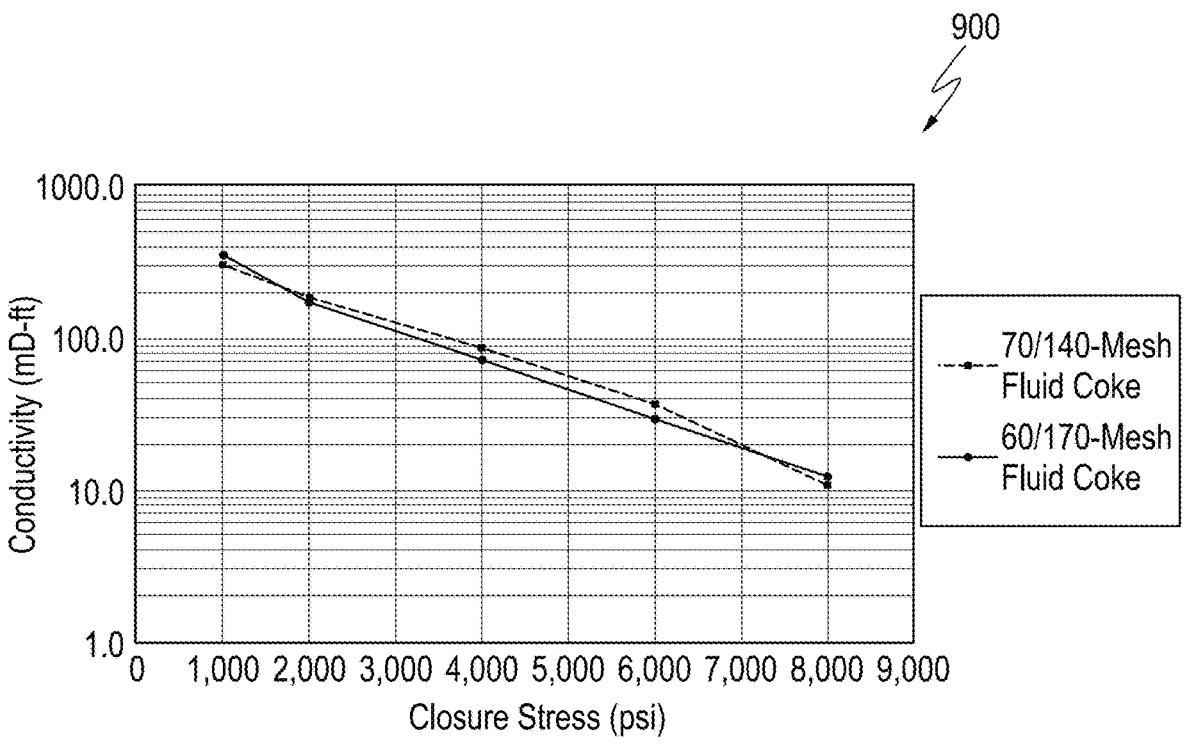
FIG. 9 is a graph comparing the conductivity of 70-mesh to 140-mesh petroleum coke particles to the conductivity of 60-mesh to 170-mesh petroleum coke particles.

Conductivity testing has shown that the range of petroleum coke particle sizes can be expanded beyond the 70-mesh to 140-mesh range to larger and smaller particle sizes without compromising the conductivity of the particles. The results of such conductivity testing are shown in FIG. 9, which is a graph 900 comparing the conductivity (in millidarcy-feet (mD-ft)) of 70-mesh to 140-mesh (i.e., 70/140-mesh) petroleum coke particles to the conductivity (in mD-ft) of 60-mesh to 170-mesh (i.e., 60/170-mesh) petroleum coke particles. As shown, the 60/170-mesh petroleum coke particles performed very similarly to the 70/140-mesh petroleum coke particles in terms of conductivity. As a result, the range of different sizes of petroleum coke particles that can be utilized as proppant can be expanded to at least the 60/170-mesh range, effectively increasing the availability and reducing the cost of such particles.

Figure 10:
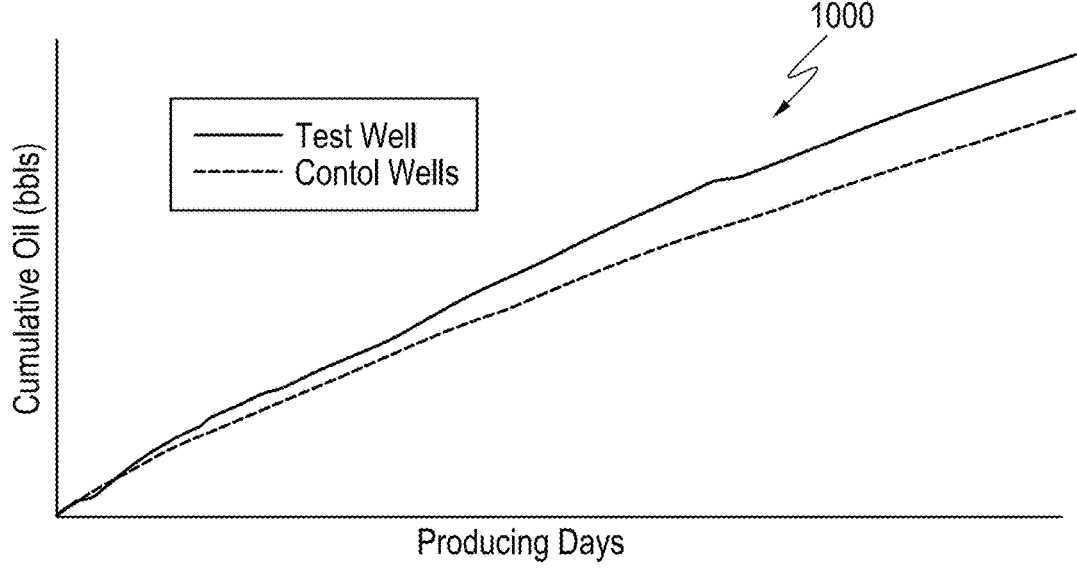
FIG. 10 is a graph showing that 10% production uplift was observed for a test well that utilized petroleum coke as a portion of the proppant during hydraulic fracturing as compared to control wells that utilized only sand as the proppant during hydraulic fracturing.

Extensive, carefully designed tests were conducted utilizing petroleum coke proppant particles during hydraulic fracturing operations, and representative results are presented in FIG. 10. The results of some of these field trials is summarized by FIG. 10, which is a graph 1000 showing that 10% production uplift was observed for a representative well that utilized petroleum coke as a portion of the proppant during hydraulic fracturing as compared to control wells that utilized only sand as the proppant during hydraulic fracturing. Furthermore, field tests and fracture models revealed that greater production uplift can be achieved by pumping petroleum coke proppant particles sequentially with non-coke proppant particles, rather than blended or mixed with the non-coke proppant particles.

Differences in production uplift may also be observed depending on the sequence with which the different fracturing fluids are injected into the formation. In various embodiments, the fracturing fluid including the coke proppant particles may be pumped during a first time interval of the treatment (e.g., during the first one-third of the treatment), during a second time interval of the treatment (e.g., during the second one-third of the treatment), and/or during a third time interval of the treatment (e.g., during the last one-third of the treatment). Such intervals may alternatively be referred to herein as the "early treatment phase," "middle treatment phase," and "late treatment phase," respectively.

The sequential pumping of multiple fracturing fluids with differing compositions according to aspects and embodiments described herein provides a number of advantages. First, in some embodiments, such sequential pumping simplifies the fracturing operation since the concentration of each proppant does not have to be adjusted on the fly as the fracturing operation progresses. Second, such sequential pumping enables the majority of the coke proppant particles to be strategically pumped during intervals where the coke proppant particles have the highest likelihood of traveling furthest into the fractures.

Any suitable type(s) of petroleum coke and/or other type(s) of coke may be used for the coke proppant particles described herein. For example, the coke proppant particles may include but are not limited to fluid coke particles, flexicoke particles, delayed coke particles, thermally post-treated coke particles, pyrolysis coke particles, coal-derived coke particles (e.g., blast furnace coke particles and/or metallurgical coke particles), microproppant coke particles, or any combination thereof.

For embodiments in which flexicoke particles are utilized as at least a portion of the coke proppant particles described herein, such flexicoke particles are produced via the FLEXI-COKING™ process. Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOK-ING™ process.

The gasification process of FLEXICOKING™ results in substantial concentration of metals in the flexicoke product and additionally allows for operational desulfurization of sulfur from the flexicoke. The gasification can be minimized or maximized to influence the sulfur content (minimization=lower sulfur content). Accordingly, unlike cokes formed in other processes, flexicoke has a comparatively high metal content and a comparatively lower sulfur content that can be manipulated.

In various embodiments, the flexicoke particles may have a carbon content that is in a range from around 85 weight percent (wt %) to around 99 wt % (e.g., from around 85, 87, 89, 91 wt %, to 93, 95, 97, 99 wt %); a weight ratio of carbon to hydrogen that is in a range from around 80:1 to around 95:1 (e.g. from around 80:1, 85:1, to 90:1, 95:1); and an impurities content (i.e., a weight percent of all components other than carbon and hydrogen) that is in a range from around 1 wt % to around 10 wt % (e.g., around found 1, 2, 3, 4, 5 wt %, to 6, 7, 8, 9, 10 wt %). Flexicoke also has a higher metal content than other cokes. In particular, the flexicoke particles may have a combined vanadium and nickel content that is in a range from around 3,000 parts per million (ppm) to around 45,000 ppm (e.g., from around 3,000, 10,000, 15,000 ppm, to 20,000, 25,000, 30,000 ppm, to 35,000, 40,000, 45,000 μm). In addition, the flexicoke particles may have a sulfur content that is in a range from 0 wt % to around 5 wt % (e.g. from 0, 1, 2 wt %, to 3, 4, 5 wt %), as well as a nitrogen content that is in a range from 0 wt % to around 3 wt % (e.g., from 0, 0.5, 1.0, 1.5 wt %, to 2.0 2.5, 3.0 wt %).

The apparent density of the flexicoke particles may be in a range from around 1.0 g/cm³ to around 2.0 g/cm³ (e.g., from around 1.0, 1.1, 1.2, 1.3 g/cm³, to 1.4, 1.5, 1.6, 1.7 g/cm³, to 1.8, 1.9, 2.0 g/cm³). Conventional sand-based proppants generally have apparent densities of at least around 2.5 g/cm³. Thus, the flexicoke particles have substantially lower apparent densities compared to conventional, sand-based proppants, which is indicative of their comparably more effective transport and lower settling rates within a fracture formed as part of a hydraulic fracturing operation.

For embodiments in which fluid coke particles are utilized as at least a portion of the coke proppant particles described herein, such fluid coke particles are obtained via a fluid coking process. Generally-speaking, flexicoke is considered to be a type (or subset) of fluid coke. Therefore, as expected, the fluid coke particles include a number of the same (or similar) characteristics as flexicoke. However, the fluid coking process may be manipulated in various ways to produce fluid coke particles having a number of distinctive characteristics. For example, the fluid coke particles may have a carbon content that is in a range from around 75 wt % to around 93 wt % (e.g., from around 75, 77, 79, 81, 83 wt %, to 85, 87, 91, 93 wt %); a weight ratio of carbon to hydrogen that is in a range from around 30:1 to around 50:1 (e.g., around 30:1, 35:1, to 40:1, 45:1, 50:1); and an impurities content that is in a range from around 5 wt % to around 25 wt % (e.g., from around 5, 10, 15 wt %, to 20, 25 wt %). The fluid coke particles may also have a sulfur content that is in a range from around 3 wt % to around 10 wt % (e.g., from around 3, 4, 5, 6 wt %, to 7, 8, 9, 10 wt %), as well as a nitrogen content that is in a range from around 0.5 wt % to around 3 wt % (0.5, 1.0, 1.5 wt %, to 2.0, 2.5, 3.0 wt %). In addition, the apparent density of the fluid coke particles may be in a range from around 1.4 g/cm³ to around 2.0 g/cm³ (e.g., from around 1.4, 1.5, 1.6 g/cm³, to 1.7, 1.8, 1.9, 2.0 g/cm³).

For embodiments in which delayed coke particles are utilized as at least a portion of the coke proppant particles described herein, such delayed coke particles are produced within a delayed coking unit via a delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which typically has an outlet temperature that is in a range from around 480° C. to around 515° C. The heated feedstock then enters a reactor, referred to as a "coke drum," which typically operates at temperatures that are in a range from around 415° C. to around 450° C. Within the coke drum, the cracking reactions continue. The resulting cracked products then exit the coke drum as an overhead stream, while coke deposits on the inner surface of the coke drum. In general, this process is continued for a period of around 16 hours to around 24 hours to allow the coke drum to fill with coke. In addition, to allow the delayed coking unit to operate on a batch-continuous (or semi-continuous) basis, two or more coke drums are typically used. While one coke drum is on-line filling with coke, the other coke drum is being steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

The delayed coke particles may exhibit the following properties: (1) a carbon content that is in a range from around 82 wt % to around 90 wt % (e.g., from around 82, 83, 84, 85 wt %, to 86, 87, 88, 89, 90 wt %); (2) a weight ratio of carbon to hydrogen that is in a range from around 15:1 to around 30:1 (e.g., from around 15:1, 20:1, to 25:1, 30:1); (3) a combined vanadium and nickel content that is in a range from around 100 ppm to around 3,000 ppm (e.g., from around 100, 500, 1,000, 1,500 ppm, to 2,000, 2,500, 3,000 ppm); (4) a sulfur content that is in a range from around 2 wt % to around 8 wt % (e.g., from around 2, 3, 4, 5 wt %, to 6, 7, 8 wt %); and/or (5) a nitrogen content that is in a range from around 1 wt % to around 2 wt % (e.g., from around 1.0, 1.2, 1.4 wt %, to 1.6, 1.8, 2.0 wt %), where such properties are measured on a dry, ash-free basis (or, in other words, not counting residual ash content and removing moisture before the analysis). In addition, the delayed coke particles may have a moisture content that is in a range from around 6 wt % to around 14 wt % (e.g., from around 6, 8, 10 wt %, to 12, 14 wt %) and a volatile matter content that is in a range from around 6 wt % to around 18 wt % (e.g., from around 6, 8, 10, 12 wt %, to 14, 16, 18 wt %), as measured on an as-received basis. Moreover, the apparent density of the delayed coke particles may be in a range from around 1.0 g/cm$^3$ to around 1.7 g/cm$^3$ (e.g., from around 1.0, 1.1, 1.2, 1.3 g/cm$^3$, to 1.4, 1.5, 1.6, 1.7 g/cm$^3$). Furthermore, the crush strength of the delayed coke particles may be comparable to the crush strengths of other types of petroleum coke particles.

For embodiments in which microproppant coke particles are utilized as at least a portion of the coke proppant particles described herein, such microproppant coke particles may include wet flexicoke fines and/or dry flexicoke fines produced as a byproduct of the FLEXICOKING™ process. Additionally or alternatively, the microproppant coke particles may include sieved fluid coke, sieved flexicoke, sieved delayed coke, sieved thermally post-treated coke, sieved pyrolysis coke, and/or sieved coal-derived coke (e.g., sieved blast furnace coke and/or sieved metallurgical coke). Additionally or alternatively, in some embodiments, the microproppant coke particles may include ground fluid coke, ground flexicoke, ground delayed coke, ground thermally post-treated coke, ground pyrolysis coke, and/or ground coal-derived coke (e.g., ground blast furnace coke and/or ground metallurgical coke). Moreover, any other suitable types of microproppant coke particles may be additionally or alternatively utilized.

With respect to the utilization of microproppant coke particles including wet and/or dry flexicoke fines as at least a portion of the coke proppant particles described herein, such flexicoke fines are byproducts of the FLEXICOKING™ process, which are collected as particles that were not recovered in the secondary cyclones of the heater within the flexicoker. More specifically, the particles are collected first in the tertiary cyclone as dry flexicoke fines, and the smaller particles that travel past the tertiary cyclone are then recovered in the venturi scrubber as wet flexicoke fines. While at least a portion of such flexicoke fines would typically be considered as waste, the present disclosure provides for the effective utilization of such flexicoke fines during hydraulic fracturing operations.

With respect to the utilization of microproppant coke particles including sieved fluid coke, sieved flexicoke, sieved delayed coke, sieved thermally post-treated coke, sieved pyrolysis coke, and/or sieved coal-derived coke (e.g., sieved blast furnace coke and/or sieved metallurgical coke) as at least a portion of the coke proppant particles described herein, any suitable type(s) of filters, screens, and/or associated machinery may be utilized to separate any suitable type(s) of bulk coke granules into larger particles as well as smaller particles that are suitable for utilization as the microproppant coke particles. Furthermore, with respect to the utilization of microproppant coke particles including ground fluid coke, ground flexicoke, ground delayed coke, ground thermally post-treated coke, ground pyrolysis coke, and/or ground coal-derived coke (e.g., ground blast furnace coke and/or ground metallurgical coke) as at least a portion of the coke proppant particles described herein, any suitable type(s) of grinding/milling technique(s) may be used to produce such microproppant coke particles. For example, in some embodiments, coke granules may be processed using hammer milling techniques, jet milling techniques, ball milling techniques, or the like, where each of these techniques generally involves crushing or pulverizing the coke granules to a suitable size and shape. Moreover, those skilled in the art will appreciate that any number of other grinding, milling, or other processing techniques may be additionally or alternatively used, depending on the details of the particular implementation.

In various embodiments, the microproppant coke particles that may be utilized according to embodiments described herein include particle sizes of at most 105 μm (140 mesh) or, in some cases, particle sizes of at most 88 μm (170 mesh), but potentially within a range from around 0.0001 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm).

Moreover, in various embodiments, such microproppant coke particles have an apparent density that is in a range from around 1.0 g/cm$^3$ to around 2.0 g/cm$^3$ (e.g., from around 1.0, 1.1, 1.2, 1.3 g/cm$^3$, to 1.4, 1.5, 1.6, 1.7 g/cm$^3$, to 1.8, 1.9, 2.0 g/cm$^3$), although the exact apparent density of the particles may vary depending on the specific type(s) of coke utilized. By comparison, sand generally has an apparent density of at least around 2.5 g/cm$^3$. Therefore, because the settling rate is proportional to the difference in density between the solid particles and the carrier fluid (as shown in expressions for both Stokes terminal settling velocity and Ferguson & Church settling velocity), such microproppant coke particles have a significantly lower settling rate than sand. As a result, proppant particles formed from microproppant coke particles will perform better than proppant particles formed from sand in terms of transport capacity within hydraulic fractures that are created, reopened, and/or extended during a hydraulic fracturing operation.

Furthermore, with respect to the utilization of microproppant coke particles as at least a portion of the coke proppant particles described herein, such microproppant coke particles provide a number of additional advantages over non-coke proppants. As an example, the microproppant coke particles are small enough to enter regions of secondary and natural fractures that cannot be effectively reached by non-coke proppants. As another example, due to the enhanced transport properties of the microproppant coke particles, such particles are capable of creating larger hydraulic fractures (i.e., by increasing one or more dimensions of such hydraulic fractures, such as the fracture lengths, heights, and/or azimuths) than non-coke proppants. As another example, the utilization of the microproppant coke particles as at least a portion of the coke proppant particles described herein may enable the flow rate of the low-viscosity fracturing fluid to be increased since a portion of the low-viscosity fracturing fluid may be diverted into the secondary hydraulic fractures and/or the natural fractures. As another example, the utilization of the microproppant coke particles as at least a portion of the coke proppant particles described herein may help to control the leak-off of the low-viscosity fracturing fluid into the secondary and natural fractures, thereby increasing the fracturing fluid efficiency and leading to the creation of larger conductive fractures.

Turning to details regarding exemplary characteristics of the fracturing fluid in which the coke proppant particles described herein may be employed, such fracturing fluid may include (in addition to the coke proppant particles) a flowable carrier fluid and one or more optional additives. In various embodiments, the fracturing fluid is formulated at the well site in a mixing process that is conducted concurrently with the pumping of the fracturing fluid into the wellbore during the hydraulic fracturing process. When the fracturing fluid is formulated at the well site, the coke proppant particles may be added in a manner similar to known methods for adding proppant to fracturing fluid.

The carrier fluid according to the present disclosure may be an aqueous carrier fluid that includes water or a nonaqueous carrier fluid that is substantially free of water. Aqueous carrier fluids may include, for example, fresh water, salt water (including seawater), treated water (e.g., treated production water), one or more other forms of aqueous fluid, or any combination thereof. One aqueous carrier fluid class is often referred to as slickwater, and the corresponding fracturing operations are often referred to as slickwater fracturing operations. Nonaqueous carrier fluids may include, for example, oil-based fluids (e.g., hydrocarbon, olefin, mineral oil), alcohol-based fluids (e.g., methanol), or any combination thereof. In various embodiments, the viscosity of the carrier fluid may be altered by foaming or gelling. Foaming may be achieved using, for example, air or other gases (e.g., CO$_2$, N$_2$), alone or in combination.

Gelling may be achieved using, for example, guar gum (e.g., hydroxypropyl guar), cellulose, or other gelling agents, which may or may not be crosslinked using one or more crosslinkers, such as polyvalent metal ions or borate anions, among other suitable crosslinkers.

In some instances, the carrier fluid used according to embodiments described herein includes one or more aqueous carrier fluid types, particularly in light of the large volumes of fluid that are typically required (e.g., potentially around 60,000 to around 1,000,000 gallons per wellbore). The aqueous carrier fluid may or may not be gelled. The utilization of gelled aqueous carrier fluids (either crosslinked or un-crosslinked) may facilitate better proppant particle transport (i.e., reduce settling), as well as provide improved physical and chemical strength to withstand the temperatures, pressures, and shear stresses encountered by the fracturing fluid during a hydraulic fracturing operation. In some instances, the fracturing fluid includes an aqueous carrier fluid, which may or may not be foamed or gelled, and an acid (e.g., HCl) to further stimulate and enlarge pore areas of the matrix of fracture surfaces. It is to be appreciated that the low density of the coke proppant particles described herein may allow a reduction or elimination of the need to foam or gel the carrier fluid.

In various embodiments, the carrier fluid may be a high-salinity carrier fluid with a specific gravity of at most 1.1. In such embodiments, the high-salinity carrier fluid may be an aqueous carrier fluid constituting produced water, which can be cost-effectively and efficiently reused as carrier fluid. In such embodiments, the utilization of the high-salinity carrier fluid increases buoyancy effects, which can further improve the proppant transport capacity of the corresponding fracturing fluid.

In various embodiments, the fracturing fluid includes one or more additives. Such additives may include but are not limited to one or more acids, one or more biocides, one or more breakers, one or more corrosion inhibitors, one or more crosslinkers, one or more friction reducers (e.g., polyacrylamides), one or more high-viscosity friction reducers, one or more gels, one or more crosslinked gels, one or more oxygen scavengers, one or more pH control additives, one or more scale inhibitors, one or more surfactants, one or more weighting agents, one or more inert solids, one or more fluid loss control agents, one or more emulsifiers, one or more emulsion thinners, one or more emulsion thickeners, one or more viscosifying agents, one or more foaming agents, one or more stabilizers, one or more chelating agents, one or more mutual solvents, one or more oxidizers, one or more reducers, one or more clay stabilizing agents, or any combination thereof.

For embodiments in which one or more friction reducers are included in the fracturing fluid, such friction reducers may be included at a concentration range of around 0.5 gallons per thousand gallons (gpt) to around 1.0 gpt (e.g., around 0.5, 0.6, 0.7 gpt, to 0.8, 0.9, 1.0 gpt). In some embodiments, the friction reducer may include around 30% active polymer solution for emulsions. This may be equivalent to around 1.35 pounds per thousand gallons (pptg) to around 2.7 pptg (e.g., around 1.35, 1.5, 1.65, 1.8, 1.95 pptg, to 2.1, 2.25, 2.4, 2.55, 2.7 pptg). In such embodiments, this concentration may be used to limit the cost of the friction reducer and to increase the transport capacity of the proppant within the fracturing fluid. Furthermore, the utilized friction reducers should be resistant to high salinity at relatively low concentrations (e.g., around 0.5 gpt to around 1.0 gpt).

Moreover, in some embodiments, friction reducers may be added to the fracturing fluid at a concentration of around 0.5 part per thousand (ppt) to around 8 ppt (e.g., from around 0.5, 0.75, 1, 2, 3, 4 ppt, to 5, 6, 7, 8 ppt). In some embodiments, emulsion-based friction reducer may be added to the fracturing fluid at a concentration of around 0.5 gpt to around 5 gpt, with around 20% to around 40% active polymer solution. In other embodiments, dry friction reducer may be added to the fracturing fluid.

The methods described herein include the preparation of the fracturing fluid, which is not considered to be particularly limited because the coke proppant particles are capable of transportation in dry form or as part of a wet slurry from a manufacturing site (e.g., a refinery or synthetic fuel plant). Dry and wet forms may be transported via truck or rail, and wet forms may further be transported via pipelines. The transported dry and/or wet forms of the coke proppant particles may be combined with the carrier fluid and the optional additives at a production site, either directly into a wellbore or by pre-mixing in a hopper or other mixing equipment. For example, in some embodiments, slugs of the dry and/or wet forms of the coke proppant particles are added directly to the fracturing fluid (e.g., as it is introduced into the wellbore). In other embodiments, a portion or all of the fracturing fluid is pre-mixed at the production site. Any other suitable mixing or adding of the coke proppant particles to produce a desired fracturing fluid composition may also be used, without departing from the scope of the present disclosure.

The methods of hydraulic fracturing suitable for use in one or more embodiments described herein involve pumping the fracturing fluids at a high pump rate into a subterranean formation to form hydraulic fractures in the subterranean formation. In various embodiments, this process is conducted one stage at a time along a wellbore. Specifically, the stage of interest is hydraulically isolated from any other stages that have been previously hydraulically fractured and propped. In some embodiments, the stage of interest includes perforation clusters within the production casing string of the wellbore, which enable the fracturing fluids to flow out of the wellbore and into the subterranean formation. In some embodiments, the pump rate of the fracturing fluids during the hydraulic fracturing operation is at least around 20 barrels per minute (bbl/min) (0.05 cubic meters per second ($m^3$/s)), preferably at least around 30 bbl/min (0.08 $m^3$/s), and more preferably at least 50 bbl/min (0.14 $m^3$/s) and at most 1000 bbl/min (2.73 $m^3$/s) at one or more time durations during the hydraulic fracturing operation (e.g., the rate may be constant, steadily increased, or pulsed). These high rates may, in some embodiments, be utilized after around 10% of the entire volume of fracturing fluid to be pumped into the subterranean formation has already been injected. That is, at the early periods of the hydraulic fracturing operation, the pump rate may be lower and as hydraulic fractures begin to form, the pump rate may be increased. Generally, the average pump rate of the fracturing fluids throughout the hydraulic fracturing operation may be around 10 bbl/min (0.03 $m^3$/s), preferably around 15 bbl/min (0.04 $m^3$/s), and more preferably at least 25 bbl/min (0.07 $m^3$/s) and at most 250 bbl/min (0.68 $m^3$/s). Typically, the pump rate of the fracturing fluids during the hydraulic fracturing operation for more than 30% of the time required to complete the hydraulic fracturing with respect to a particular stage may be in the range of around 20 bbl/min (0.05 $m^3$/s) to around 150 bbl/min (0.41 $m^3$/s), or around 40 bbl/min (0.11 $m^3$/s) to around 120 bbl/min (0.33 $m^3$/s), or around 40 bbl/min (0.11 $m^3$/s) to around 100 bbl/min (0.27 $m^3$/s).

According to aspects and embodiments described herein, multiple fracturing fluids are pumped sequentially, meaning that a fracturing fluid with coke proppant particles is pumped at one or more time intervals, while a different fracturing fluid with non-coke proppant particles (e.g., sand) and, optionally, some amount of coke proppant particles is pumped at one or more other time intervals. In some embodiments, around 10 vol % to around 67 vol % (e.g., around 10, 15, 20, 25 vol %, to 30, 35, 40, 45 vol %, to 50, 55, 60, 65, 67 vol %) of the total proppant particles pumped per stage may constitute coke proppant particles. In some such embodiments, around 15 vol % of the total proppant particles pumped per stage may constitute coke proppant particles. In other such embodiments, around 33 vol % of the total proppant particles pumped per stage may constitute coke proppant particles. In other such embodiments, around 50 vol % of the total proppant particles pumped per stage may constitute coke proppant particles. Moreover, in other such embodiments, around 67 vol % of the total proppant particles pumped per stage may constitute coke proppant particles.

Furthermore, according to aspects and embodiments described herein, the pumping schedule for sequentially pumping the fracturing fluids into the formation may vary depending on the details of the particular implementation. In some embodiments, a first fracturing fluid including coke proppant particles may be pumped during a first time interval of the treatment (e.g., in some cases, during the first one-third of the treatment) for the stage, with a second fracturing fluid including the non-coke proppant particles (and coke proppant particles, if any) being pumped during the remainder of the treatment for the stage. This may allow the coke proppant particles to travel with the fracturing fluid into the tips (or at least within proximity to the tips) of the formed hydraulic fractures. In other embodiments, a fracturing fluid including coke proppant particles may be pumped during a second interval of the treatment (e.g., in some cases, during the second one-third of the treatment) for the stage, with a different fracturing fluid including non-coke proppant particles (and coke proppant particles, if any) being pumped during the remainder of the treatment for the stage. In other embodiments, a fracturing fluid including coke proppant particles may be pumped during a third interval of the treatment (e.g., in some cases, during the last one-third of the treatment) for the stage, with a different fracturing fluid including non-coke proppant particles (and coke proppant particles, if any) being pumped during the remainder of the treatment for the stage. This may allow the coke proppant particles to displace the earlier-introduced proppant further away from the wellbore, thus increasing the size of the created fractures. In yet other embodiments, a fracturing fluid including coke proppant particles may be pumped during the first and second intervals of the treatment for the stage, during the first and third intervals of the treatment for the stage, or during the second and third intervals of the treatment for the stage, with a different fracturing fluid including non-coke proppant particles (and coke proppant particles, if any) being pumped during the remainder of the treatment for the stage. Moreover, it should be noted that the pumping schedule may alternatively be broken down into any other suitable number of intervals, such as, for example, two intervals, four intervals, or six intervals, depending on the details of the particular implementation.

In certain embodiments of this disclosure, the total concentration of coke proppant particles in the fracturing fluid can be at least 14 kilograms (kg) of coke proppant particles per cubic meter ($m^3$) of the carrier fluid, and can range from, e.g., 14, 15, 16, 17, 18, 19, 20 kg·$m^{-3}$, to 21, 22, 23, 24, 25, 26, 27, 28, 29, 30 kg·$m^{-3}$, to 35, 40, 45, 50, 55, 60, 65, 70 kg·$m^{-3}$, to 80, 90, 95, 96, 100, 150, 160, 180, 200 kg·$m^{-3}$, to 220, 240, 250, 260, 280, 300 kg·$m^{-3}$, to 350, 400, 450, 480 kg·$m^{-3}$, based on the volume of the carrier fluid. A concentration range from 18 to 120 kg·$m^{-3}$ is highly desirable. A preferable concentration range is from 23 to 96 kg·$m^{-3}$. At a total coke particle concentration in the fracturing fluid below 14 kg·$m^{-3}$, the amount of coke proppant particles introduced into the subterranean formation is too low to function as an effective proppant at a given, reasonable volume of carrier fluid; or alternatively, if a reasonable amount of coke proppant particles were to be introduced into the subterranean formation, an infeasibly large volume of the carrier fluid would have to be injected. At a coke particle concentration in the fracturing fluid at above 480 kg $m^{-3}$, the cost of the coke proppant particles can be too high to justify additional benefit of the higher amount, if any at all.

The coke proppant particles present in the fracturing fluid of this disclosure can comprise microproppant coke particles. Thus, in the fracturing fluid of this disclosure, where all of the coke proppant particles present are microproppant coke proppant particles, the concentration of the microproppant coke proppant particles in weight relative to the volume of carrier fluid therein can range from, e.g., 14 to 480 kg·$m^{-3}$, preferably from 18 to 120 kg·$m^{-3}$, and more preferably from 23 to 96 kg·$m^{-3}$. Where the concentration of the microproppant coke proppant particles is x wt % of the total weight of all coke proppant particles present in the fracturing fluid, the concentration of the microproppant coke proppant particles in weight relative to the volume of the carrier fluid therein can range from, e.g., 14*x % to 480*x % kg·$m^{-3}$, preferably from 18*x % to 120*x % kg·$m^{-3}$, and more preferably from 23*x % to 96*x % kg·$m^{-3}$.

While without intending to be bound by a particular theory, it is believed that in many modern unconventional hydrocarbon recovery processes involving horizontal drilling and hydraulic fracturing, the hydrocarbon-bearing subterranean formations tend to have very low permeability, rendering fluid loss due to the presence of natural cracks not a significant issue. As such, the coke proppant particles in the fracturing fluid of this disclosure function essentially as proppants instead of fluid loss preventers, by maintaining induced cracks open ("propped") after pressure relief following hydraulic fracturing, allowing hydrocarbon to migrate from the formation through the induced cracks into the wellbore during hydrocarbon production. The coke proppant particles, in general and regardless of particle size, due to their low apparent density, tend to stay dispersed in the carrier fluid for a longer time instead of settling out, enabling them to be transported further into distant crack locations than heavy proppant particles such as sand and commercially available microproppant particles based on ceramic materials, to maintain longer and more cracks open, thereby enhancing hydrocarbon recovery. Additionally, the microproppant coke proppant particles, due to their small sizes, can stay in the carrier fluid even longer than the coke proppant particles having a size greater than 105 μm, enter into even more distant cracks from the wellbore and cracks with sizes smaller than 105 μm near or distant from the wellbore, keep those cracks open, and significantly improve hydrocarbon recovery during production.

The hydraulic fracturing methods described herein may be performed in drilled hydrocarbon-producing wellbores including vertical, deviated, highly deviated, and/or lateral sections. Such wellbores may be drilled into various types of unconventional subterranean formations, including but not limited to tight sandstone formations, tight carbonate formations, shale gas formations, coal bed methane formations, and/or tight oil formations. As described herein, such wellbores are typically completed using casing strings that are cemented into the subterranean formation. To contact the subterranean formation, a number of perforation clusters are typically created through the production casing string, in which case the wellbore may be referred to as a plug and perforated ("plug-and-perf") cased-hole completion. Alternative completion techniques may be used without departing from the scope of the present disclosure, but in each completion technique, a finite length of the wellbore is exposed for hydraulic fracturing and injection of the fracturing fluid. This finite section is referred to herein as a "stage." In plug-and-perf completions, the stage length may be based on a distance over which the tubular and cement has been perforated, and may be in excess of around 25 ft, but more typically in excess of around 100 ft.

During the plug-and-perf process, the stage of interest may be isolated using one or more diversions materials such that the pressurized fracturing fluid flows through the perforation clusters within the particular stage and into the subterranean formation to generate one or more hydraulic fractures in only the stage area. Such diversion materials may include but are not limited to one or more types of plugs (e.g., bridge plugs, packers, baffle/plug combinations, or the like), one or more types of particulate diverters (e.g., sand, ceramic material, salt, wax, resin, and/or other compounds), one or more types of perforation plugging devices, one or more types of ball-and-seat devices (e.g., ball sealers, with or without retaining devices), one or more types of chemical diverters (e.g., liquids and/or gels), and/or one or more types of dart-and-sleeve devices (e.g., any type of sleeve device in which a ball or dart is dropped from the surface, contacting and opening a particular sleeve, which permits injections into a new stage, while simultaneously blocking flow to the stages below). Moreover, in some embodiments, at least a portion of such diversion materials are provided in dissolvable, biodegradable, or self-destructible form, such that the diversion materials are designed to dissolve, degrade, or self-destruct, respectively, and then flow out of the wellbore, potentially without performing a wellbore cleanout procedure.

For each linear foot of the stage, at least around 6 barrels (24 cubic feet ($ft^3$)), preferably around 24 barrels (135 $ft^3$), and more preferably at least 60 barrels (335 $ft^3$) and at most 6,000 barrels (33,500 $ft^3$) of fracturing fluid may be injected to grow the hydraulic fractures. In certain embodiments, for each linear foot of the stage, at least around 0.3 barrels (1.6 $ft^3$), preferably around 1.1 barrels (6.4 $ft^3$), and more preferably at least 2.8 barrels (16 $ft^3$) and at most 285 barrels (1600 $ft^3$) of proppant particles may be injected to prop the hydraulic fractures.

Turning to details of exemplary hydraulic fracturing processes according to the present disclosure, FIG. 11 is a process flow diagram of an exemplary hydraulically fracturing process 1100 for sequentially introducing multiple fracturing fluids with differing compositions into a subterranean formation. More specifically, the process 1100 includes hydraulically fracturing the subterranean formation by sequentially pumping multiple fracturing fluids including differing concentrations of coke proppant particles and non-coke proppant particles into the subterranean formation via a wellbore. The exemplary process 1100 begins at block 1102, at which a first fracturing fluid including first coke proppant particles (as well as a carrier fluid and any additives) is pumped into a subterranean formation during a time interval T1 of the hydraulic fracturing operation, such that a first weight of the first coke proppant particles, WCP1, is pumped into the subterranean formation. At block 1104, a second fracturing fluid differing from the first fracturing fluid and including non-coke proppant particles and optionally second coke proppant particles (as well as a carrier fluid and any additives) is pumped into the subterranean formation during a time interval T2 of the hydraulic fracturing operation, such that a second weight of the second coke proppant particles, if any, WCP2, is pumped into the subterranean formation. In the process 1100, WCP1/WCP2≥1.2. Moreover, in some embodiments, WCP1/WCP2≥2.0. The value of WCP1/WCP2 can be at least, e.g., 5.0, 10, 20, 50, 80, 100, 200, 500, 800, 1000, 2000, 5000, 8000, 10000. Where WCP2=0, i.e., the second weight of the second coke proppant particles is zero, the ratio or WCP1/WCP2 is infinite.

In some embodiments, the first coke proppant particles are present in the first fracturing fluid at a concentration of CCP1 vol %, based on a total volume of proppant particles present in the first fracturing fluid, on a dry particle basis; the second coke proppant particles are present in the second fracturing fluid at a concentration of CCP2 vol %, based on a total volume of proppant particles present in the second fracturing fluid on a dry particle basis; and CCP1/CCP2≥1.2. In some such embodiments, CCP1≥60 (e.g., 70, ≥80, ≥90, or even about 100) and CCP2≤20 (e.g., ≤15, ≤10, ≤8, ≤2, ≤1, ≤0.1, or ≤0.01, or zero). In some such embodiments, CCP1/CCP2≥2.0 (e.g., ≥10, ≥100, ≥1000). In some such embodiments, CCP1≥20 (≥50; ≥60; ≥80; or even about 100), and CCP2=0. Where CCP2=0, the ratio of CCP1/CCP2 is infinite.

In some preferred embodiments, T1 precedes T2. In these embodiments, more coke proppant particles are introduced into the subterranean formation in T1, an earlier interval, than in T2. These embodiments are particularly advantageous because the coke proppant particles are able to transport further in fractures occupied to a less degree by non-coke proppant particles previously introduced into the fractures. In such embodiments, preferably during time interval T1, the first fracturing fluid is free of non-coke proppant particles. In other such embodiments, preferably WCP2=0, i.e., no coke proppants are introduced into the subterranean formation during time interval T2. In such embodiments, T1 may preferably be the leading interval of the hydraulic fracturing operation. In such embodiments, the process 1100 may further include, during a time interval T3 that occurs before T1, pumping a third fracturing fluid including non-coke proppant particles (e.g., sand; preferably at a quantity less than WCP1) into the subterranean formation. In certain embodiments, in T3, the quantity of the non-coke proppant particles introduced into the subterranean formation is relatively small, e.g., ≤0.8*WCP1, ≤0.6*WCP1, ≤0.5*WCP1; ≤0.4*WCP1; ≤0.3*WCP1; ≤0.2*WCP1; ≤0.1*WCP1; ≤0.05*WCP1; ≤0.01*WP1; ≤0.005*WCP1; ≤0.001*WCP1. In certain embodiments, in T3, the quantity of coke proppant particles introduced into the subterranean formation is relatively small, e.g., ≤0.8*WCP1, ≤0.6*WCP1, ≤0.5*WCP1; ≤0.4*WCP1; ≤0.3*WCP1; ≤0.2*WCP1; ≤0.1*WCP1; or even zero. We have found that, by injecting a small quantity of non-coke proppant (e.g., sand) particles into the formation in an early time interval such as a leading time interval, followed by injecting a large quantity of coke proppant particles during one time interval, followed by injecting a large quantity of non-coke proppant particles during a subsequent interval such as an end interval, the hydrocarbon recovery rate can be surprisingly high.

In other embodiments, T2 precedes T1. In such embodiments, T2 may be the leading interval of the hydraulic fracturing operation. Moreover, in some such embodiments, a total weight of the proppant particles contained in the first fracturing fluid pumped into the subterranean formation during T1 is WTP1; a total weight of the proppant particles contained in the second fracturing fluid pumped into the subterranean formation during T2 is WTP2; and WTP2≤0.8*WTP1. Moreover, in some embodiments, WTP2≤0.2*WTP1. Such embodiments may correspond to scenarios in which a small leading load of non-coke proppant particles (e.g., sand and/or other non-coke proppants) are utilized during the hydraulic fracturing operation.

In some embodiments, the first coke proppant particles have an apparent density of from 1.0 g/cm3 to 2.0 g/cm$^3$, and the non-coke proppant particles have an apparent density of from 2.0 g/cm$^3$ to 3.0 g/cm$^3$. In some embodiments, at least 50 wt % of the first coke proppant particles have particle sizes from 88 μm to 250 μm (60/170-mesh). In some embodiments, the first coke proppant particles include petroleum coke particles, and the non-coke proppant particles include sand proppant particles.

In some embodiments, the first coke proppant particles have a total concentration in the first fracturing fluid from 14 kilograms per cubic meter to 480 kilograms per cubic meter, based on the volume of the carrier fluid present in the first fracturing fluid. In some embodiments, the first coke proppant particles have a total concentration in the first fracturing fluid from 18 kilograms per cubic meter to 120 kilograms per cubic meter, based on the volume of the carrier fluid present in the first fracturing fluid. In some embodiments, the first coke proppant particles have a total concentration in the first fracturing fluid from 23 kilograms per cubic meter to 96 kilograms per cubic meter, based on the volume of the carrier fluid present in the first fracturing fluid.

Those skilled in the art will appreciate that the exemplary process 1100 of FIG. 11 is susceptible to modification without altering the technical effect provided by the present disclosure. For example, in some embodiments, one or more blocks may be omitted from the process 1100, and/or one or more blocks may be added to the process 1100. In practice, the exact manner in which the process 1100 is implemented will depend at least in part on the details of the specific implementation.

FIG. 12 is a process flow diagram of an exemplary hydraulically fracturing process 1200 for sequentially introducing multiple fracturing fluids with differing compositions into a subterranean formation. More specifically, the process 1200 includes hydraulically fracturing the subterranean formation by sequentially pumping multiple fracturing fluids including differing concentrations of coke proppant particles and non-coke proppant particles into the subterranean formation via a wellbore. The exemplary process 1200 begins at block 1202, at which a first fracturing fluid including first coke proppant particles (as well as a carrier fluid and any additives) is pumped into the subterranean formation via the wellbore during a time interval T1 of the hydraulic fracturing operation, such that a first weight of the first coke proppant particles, WCP1, and a total weight of proppant particles within the first fracturing fluid, WTP1, are pumped into the subterranean formation. At block 1204, a second fracturing fluid including non-coke proppant particles and optionally second coke proppant particles (as well as a carrier fluid and any additives) is pumped into the subterranean formation via the wellbore during a time interval T2 of the hydraulic fracturing operation, such that a second weight of the second coke proppant particles, if any, WCP2, and a total weight of proppant particles, WTP2, are pumped into the subterranean formation. In the process 1200, WCP1/WCP2≥1.1 and WCP1/(WTP1+WTP2)≤0.5.

In some embodiments, WCP1/(WTP1+WTP2)≤0.3. In some embodiments, WCP1/WCP2≥2.

In some embodiments, T1 precedes T2. In other embodiments, T2 precedes T1. In such embodiments, T2 may be the leading interval of the hydraulic fracturing operation.

In some embodiments, a total weight of the proppant particles contained in the first fracturing fluid pumped into the subterranean formation during T1 is WTP1; a total weight of the proppant particles contained in the second fracturing fluid pumped into the subterranean formation during T2 is WTP2; and WTP2≤0.8*WTP1. Such embodiments may correspond to scenarios in which a small leading load of non-coke proppant particles (e.g., sand and/or other non-coke proppants) are utilized during the hydraulic fracturing operation.

In some embodiments, the first coke proppant particles have a total concentration in the first fracturing fluid from 14 kilograms per cubic meter to 480 kilograms per cubic meter, based on the volume of the carrier fluid present in the first fracturing fluid. In some embodiments, the first coke proppant particles have a total concentration in the first fracturing fluid from 18 kilograms per cubic meter to 120 kilograms per cubic meter, based on the volume of the carrier fluid present in the first fracturing fluid. In some embodiments, the first coke proppant particles have a total concentration in the first fracturing fluid from 23 kilograms per cubic meter to 96 kilograms per cubic meter, based on the volume of the carrier fluid present in the first fracturing fluid.

Those skilled in the art will appreciate that the exemplary process 1200 of FIG. 12 is susceptible to modification without altering the technical effect provided by the present disclosure. For example, in some embodiments, one or more blocks may be omitted from the process 1200, and/or one or more blocks may be added to the process 1200. In practice, the exact manner in which the process 1200 is implemented will depend at least in part on the details of the specific implementation.

This disclosure can include one or more of the following non-limiting aspects/embodiments.

A1. A hydraulic fracturing process, the hydraulic fracturing process comprising: during a time interval T1, pumping a first fracturing fluid comprising first coke proppant particles into a subterranean formation, such that a first weight of the first coke proppant particles, WCP1, is pumped into the subterranean formation; and during a time interval T2 that occurs before or after T1, pumping a second fracturing fluid differing from the first fracturing fluid and comprising non-coke proppant particles and optionally second coke proppant particles into the subterranean formation, such that a second weight of the second coke proppant particles, if any, WCP2, is pumped into the subterranean formation; wherein WCP1/WCP2≥1.2.

A2. The hydraulic fracturing process of A1, wherein WCP1/WCP2≥2.0.

A3. The hydraulic fracturing process of A1 or A2, wherein: the first coke proppant particles are present in the first fracturing fluid at a concentration of CCP1 volume percent (vol %), based on a total volume of proppant particles present in the first fracturing fluid, on a dry particle basis; the second coke proppant particles are present in the second fracturing fluid at a concentration of CCP2 vol %, based on a total volume of proppant particles present in the second fracturing fluid on a dry particle basis; and CCP1/CCP2≥1.2.

A4. The hydraulic fracturing process of A3, wherein CCP1≥60 and CCP2≤20.

A5. The hydraulic fracturing process of A3, wherein CCP1/CCP2≥2.0.

A6. The hydraulic fracturing process of A3, wherein CCP1≥20 (≥50; ≥60; ≥80; about 100), and CCP2=0.

A7. The hydraulic fracturing process of any of A1 to A6, wherein the first coke proppant particles have a total concentration in the first fracturing fluid from 14 kilograms per cubic meter to 480 kilograms per cubic meter, based on the volume of the carrier fluid present in the first fracturing fluid.

A8. The hydraulic fracturing process of any of A1 to A6, wherein the first coke proppant particles have a total concentration in the first fracturing fluid from 18 kilograms per cubic meter to 120 kilograms per cubic meter, based on the volume of the carrier fluid present in the first fracturing fluid.

A9. The hydraulic fracturing process of any of A1 to A6, wherein the first coke proppant particles have a total concentration in the first fracturing fluid from 23 kilograms per cubic meter to 96 kilograms per cubic meter, based on the volume of the carrier fluid present in the first fracturing fluid.

A10. The hydraulic fracturing process of any of A1 to A9, wherein the first fracturing fluid is free of non-coke proppant particles.

A11. The hydraulic fracturing process of any of A1 to A10, wherein T1 precedes T2.

A12. The hydraulic fracturing process of A11, further comprising, during a time interval T3 that occurs before T1, pumping a third fracturing fluid comprising non-coke proppant particles into the subterranean formation.

A13. The hydraulic fracturing process of A11, wherein T1 is a leading interval of a hydraulic fracturing operation.

A14. The hydraulic fracturing process of any of A1 to A10, wherein T2 precedes T1.

A15. The hydraulic fracturing process of A14, wherein T2 is a leading interval of a hydraulic fracturing operation.

A16. The hydraulic fracturing process of A14, wherein: a total weight of the proppant particles contained in the first fracturing fluid pumped into the subterranean formation during T1 is WTP1, and a total weight of the proppant particles contained in the second fracturing fluid pumped into the subterranean formation during T2 is WTP2, and WTP2≤0.8*WTP1.

A17. The hydraulic fracturing process of A16, wherein WTP2≤0.2*WTP1.

A18. The hydraulic fracturing process of any of A1 to A17, wherein the first coke proppant particles have an apparent density of from 1.0 g/cm3 to 2.0 g/cm³, and wherein the non-coke proppant particles have an apparent density of from 2.0 g/cm³ to 3.0 g/cm³.

A19. The hydraulic fracturing process of any of A1 to A18, wherein at least 50 wt % of the first coke proppant particles have particle sizes from 88 µm to 250 µm.

A20. The hydraulic fracturing process of any of A1 to A19, wherein the first coke proppant particles comprise petroleum coke particles, and the non-coke proppant particles comprise sand proppant particles.

B1. A hydraulic fracturing process, the hydraulic fracturing process comprising: during a time interval T1, pumping a first fracturing fluid comprising first coke proppant particles into a subterranean formation, such that a first weight of the first coke proppant particles, WCP1, and a total weight of proppant particles, WTP1, are pumped into the subterranean formation; and during a time interval T2 that occurs before or after the time interval T1, pumping a second fracturing fluid comprising non-coke proppant particles and optionally second coke proppant particles into the subterranean formation, such that a second weight of the second coke proppant particles, if any, WCP2, and a total weight of proppant particles, WTP2, are pumped into the subterranean formation; wherein WCP1/WCP2≥1.1; and wherein WCP1/(WTP1+WTP2)≤0.5.

B2. The hydraulic fracturing process of B1, wherein WCP1/(WTP1+WTP2)≤0.3.

B3. The hydraulic fracturing process of B1, wherein WCP1/WCP2≥2.

B4. The hydraulic fracturing process of any of B1 to B9, wherein the first fracturing fluid is free of non-coke proppant particles.

B4. The hydraulic fracturing process of any of B1 to B3, wherein T1 precedes T2.

B5. The hydraulic fracturing process of any of B1 to B3, wherein T2 precedes T1.

B6. The hydraulic fracturing process of B5, wherein T2 is a leading interval of a hydraulic fracturing operation.

B7. The hydraulic fracturing process of B6, wherein: a total weight of the proppant particles contained in the first fracturing fluid pumped into the subterranean formation during T1 is WTP1, and a total weight of the proppant particles contained in the second fracturing fluid pumped into the subterranean formation during T2 is WTP2, and WTP2≤0.8*WTP1.

B8. The hydraulic fracturing process of any of B1 to B7, wherein the first coke proppant particles have a total concentration in the first fracturing fluid from 14 kilograms per cubic meter to 480 kilograms per cubic meter, based on the volume of the carrier fluid present in the first fracturing fluid.

B9. The hydraulic fracturing process of any of B1 to B7, wherein the first coke proppant particles have a total concentration in the first fracturing fluid from 18 kilograms per cubic meter to 120 kilograms per cubic meter, based on the volume of the carrier fluid present in the first fracturing fluid.

B10. The hydraulic fracturing process of any of B1 to B7, wherein the first coke proppant particles have a total concentration in the first fracturing fluid from 23 kilograms per cubic meter to 96 kilograms per cubic meter, based on the volume of the carrier fluid present in the first fracturing fluid.

C1. A hydraulic fracturing process, the hydraulic fracturing process comprising: during a time interval T1, pumping a first fracturing fluid comprising first LWP particles into a subterranean formation, such that a first weight of the first LWP particles, WCP1, is pumped into the subterranean formation; and during a time interval T2 that occurs before or after T1, pumping a second fracturing fluid differing from the first fracturing fluid and comprising non-LWP particles and optionally second LWP particles into the subterranean formation, such that a second weight of the second LWP particles, if any, WCP2, is pumped into the subterranean formation; wherein WCP1/WCP2≥1.2.

C2. The hydraulic fracturing process of C1, wherein WCP1/WCP2≥2.0.

C3. The hydraulic fracturing process of C1 or C2, wherein: the first LWP particles are present in the first fracturing fluid at a concentration of CCP1 volume percent (vol %), based on a total volume of proppant particles present in the first fracturing fluid, on a dry particle basis; the second LWP particles are present in the second fracturing fluid at a concentration of CCP2 vol %, based on a total volume of proppant particles present in the second fracturing fluid on a dry particle basis; and CCP1/CCP2≥1.2.

C4. The hydraulic fracturing process of C3, wherein CCP1≥60 and CCP2≤20.

C5. The hydraulic fracturing process of any of C1 to C4, wherein CCP1/CCP2≥2.0.

C6. The hydraulic fracturing process of any of C1 to C5, wherein CCP1≥20, and CCP2=0.

C7. The hydraulic fracturing process of any of C1 to C6, wherein the first LWP particles have a total concentration in the first fracturing fluid from 14 kilograms per cubic meter to 480 kilograms per cubic meter, based on the volume of the carrier fluid present in the first fracturing fluid.

C8. The hydraulic fracturing process of any of C1 to C7, wherein the first LWP particles have a total concentration in the first fracturing fluid from 18 kilograms per cubic meter to 120 kilograms per cubic meter, based on the volume of the carrier fluid present in the first fracturing fluid.

C9. The hydraulic fracturing process of any of C1 to C8, wherein the first LWP particles have a total concentration in the first fracturing fluid from 23 kilograms per cubic meter to 96 kilograms per cubic meter, based on the volume of the carrier fluid present in the first fracturing fluid.

C10. The hydraulic fracturing process of any of C1 to C9, wherein the first fracturing fluid is free of non-coke proppant particles.

C11. The hydraulic fracturing process of any of C1 to C10, wherein T1 precedes T2.

C12. The hydraulic fracturing process of C11, further comprising, during a time interval T3 that occurs before T1, pumping a third fracturing fluid comprising non-LWP particles into the subterranean formation.

C13. The hydraulic fracturing process of C11, wherein T1 is a leading interval of a hydraulic fracturing operation.

C14. The hydraulic fracturing process of any of C1 to C13, wherein T2 precedes T1.

C15. The hydraulic fracturing process of C14, wherein T2 is a leading interval of a hydraulic fracturing operation.

C16. The hydraulic fracturing process of C14, wherein: a total weight of the proppant particles contained in the first fracturing fluid pumped into the subterranean formation during T1 is WTP1, and a total weight of the proppant particles contained in the second fracturing fluid pumped into the subterranean formation during T2 is WTP2, and WTP2≤0.8*WTP1.

C17. The hydraulic fracturing process of C16, wherein WTP2≤0.2*WTP1.

C18. The hydraulic fracturing process of any of C1 to C17, wherein the first LWP particles have an apparent density of from 1.0 g/cm³ to 2.0 g/cm³, and wherein the non-LWP particles have an apparent density of from 2.0 g/cm³ to 3.0 g/cm³.

C19. The hydraulic fracturing process of any of C1 to C18, wherein at least 50 wt % of the first LWP particles have particle sizes from 88 μm to 250 μm.

C20. The hydraulic fracturing process of any of C1 to C19, wherein the first LWP particles comprise petroleum coke particles, and the non-LWP particles comprise sand proppant particles.

C21. The hydraulic fracturing process of any of C1 to C20, wherein the first LWP particles and/or the second LWP particles comprise, consist essentially of, or consist of coke proppant particles, and the non-LWP particles comprise, consist essentially of, or consist of non-coke proppant particles.

C22. The process of C21, wherein the first LWP particles and/or the second LWP particles comprise, consist essentially of, or consist of petroleum coke proppant particles.

D1. A hydraulic fracturing process, the hydraulic fracturing process comprising: during a time interval T1, pumping a first fracturing fluid comprising first LWP particles into a subterranean formation, such that a first weight of the first LWP particles, WCP1, and a total weight of proppant particles, WTP1, are pumped into the subterranean formation; and during a time interval T2 that occurs before or after the time interval T1, pumping a second fracturing fluid comprising non-LWP particles and optionally second LWP particles into the subterranean formation, such that a second weight of the second LWP particles, if any, WCP2, and a total weight of proppant particles, WTP2, are pumped into the subterranean formation; wherein: WCP1/WCP2≥1.1; and WCP1/(WTP1+WTP2)≤0.5.

D2. The hydraulic fracturing process of D1, wherein WCP1/(WTP1+WTP2)≤0.3.

D3. The hydraulic fracturing process of D1 or D2, wherein WCP1/WCP2≥2.

D4. The hydraulic fracturing process of any of D1 to D3, wherein the first fracturing fluid is free of non-coke proppant particles.

D5. The hydraulic fracturing process of any of D1 to D4, wherein T1 precedes T2.

D6. The hydraulic fracturing process of any of D1 to D5, wherein T2 precedes T1.

D7. The hydraulic fracturing process of D6, wherein T2 is a leading interval of a hydraulic fracturing operation.

D8. The hydraulic fracturing process of any of D1 to D7, wherein: a total weight of the proppant particles contained in the first fracturing fluid pumped into the subterranean formation during T1 is WTP1, and a total weight of the proppant particles contained in the second fracturing fluid pumped into the subterranean formation during T2 is WTP2, and WTP2≤0.8*WTP1.

D9. The hydraulic fracturing process of any of D1 to D8, wherein the first LWP particles have a total concentration in the first fracturing fluid from 14 kilograms per cubic meter to 480 kilograms per cubic meter, based on the volume of the carrier fluid present in the first fracturing fluid.

D10. The hydraulic fracturing process of any of D1 to D9, wherein the first LWP particles have a total concentration in the first fracturing fluid from 18 kilograms per cubic meter to 120 kilograms per cubic meter, based on the volume of the carrier fluid present in the first fracturing fluid.

D11. The hydraulic fracturing process of any of D1 to D10, wherein the first LWP particles have a total concentration in the first fracturing fluid from 23 kilograms per cubic meter to 96 kilograms per cubic meter, based on the volume of the carrier fluid present in the first fracturing fluid.

D12. The hydraulic fracturing process of any of D1 to D11, wherein the first LWP particles and/or the second LWP particles comprise, consist essentially of, or consist of coke proppant particles, and the non-LWP particles comprise, consist essentially of, or consist of non-coke proppant particles.

D13. The process of any of D12, wherein the first LWP particles and/or the second LWP particles comprise, consist essentially of, or consist of petroleum coke proppant particles.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present disclosure may be modified and practiced in different but equivalent manners apparent to those skilled in the art having the benefit of the teachings herein. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present disclosure includes all alternatives, modifications, and equivalents falling within the true spirit and scope of the appended claims.

What is claimed is:

1. A hydraulic fracturing process, the hydraulic fracturing process comprising:

during a time interval T1, pumping a first fracturing fluid comprising first coke proppant particles into a subterranean formation, such that a first weight of the first coke proppant particles, WCP1, is pumped into the subterranean formation, wherein at least 50 weight percent (wt %) of the first coke proppant particles have particle sizes in a range from 88 μm to 250 μm; and during a time interval T2 that occurs before or after T1, pumping a second fracturing fluid differing from the first fracturing fluid and comprising non-coke proppant particles and second coke proppant particles into the subterranean formation, such that a second weight of the second coke proppant particles, WCP2, is pumped into the subterranean formation;

wherein WCP1/WCP2≥1.2.

2. The hydraulic fracturing process of claim 1, wherein WCP1/WCP2≥2.0.

3. The hydraulic fracturing process of claim 1, wherein:

the first coke proppant particles are present in the first fracturing fluid at a concentration of CCP1 volume percent (vol %), based on a total volume of proppant particles present in the first fracturing fluid, on a dry particle basis;

the second coke proppant particles are present in the second fracturing fluid at a concentration of CCP2 vol %, based on a total volume of proppant particles present in the second fracturing fluid on a dry particle basis; and $$CCP1/CCP2 \geq 1.2.$$

4. The hydraulic fracturing process of claim 3, wherein CCP1≥60 and CCP2≤20.

5. The hydraulic fracturing process of claim 3, wherein CCP1/CCP2≥2.0.

6. The hydraulic fracturing process of claim 3, wherein CCP1≥20.

7. The hydraulic fracturing process of claim 1, wherein the first coke proppant particles have a total concentration in the first fracturing fluid from 14 kilograms per cubic meter to 480 kilograms per cubic meter, based on the volume of the carrier fluid present in the first fracturing fluid.

8. The hydraulic fracturing process of claim 1, wherein the first coke proppant particles have a total concentration in the first fracturing fluid from 18 kilograms per cubic meter to 120 kilograms per cubic meter, based on the volume of the carrier fluid present in the first fracturing fluid.

9. The hydraulic fracturing process of claim 1, wherein the first coke proppant particles have a total concentration in the first fracturing fluid from 23 kilograms per cubic meter to 96 kilograms per cubic meter, based on the volume of the carrier fluid present in the first fracturing fluid.

10. The hydraulic fracturing process of claim 1, wherein the first fracturing fluid is free of non-coke proppant particles.

11. The hydraulic fracturing process of claim 1, wherein T1 precedes T2.

12. The hydraulic fracturing process of claim 11, further comprising, during a time interval T3 that occurs before T1, pumping a third fracturing fluid comprising non-coke proppant particles into the subterranean formation.

13. The hydraulic fracturing process of claim 11, wherein T1 is a leading interval of a hydraulic fracturing operation.

14. The hydraulic fracturing process of claim 1, wherein T2 precedes T1.

15. The hydraulic fracturing process of claim 14, wherein T2 is a leading interval of a hydraulic fracturing operation.

16. The hydraulic fracturing process of claim 14, wherein:
a total weight of the proppant particles contained in the first fracturing fluid pumped into the subterranean formation during T1 is WTP1, and
a total weight of the proppant particles contained in the second fracturing fluid pumped into the subterranean formation during T2 is WTP2, and $$WTP2 \leq 0.8 * WTP1.$$

17. The hydraulic fracturing process of claim 16, wherein WTP2≤0.2*WTP1.

18. The hydraulic fracturing process of claim 1, wherein the first coke proppant particles have an apparent density of from 1.0 g/cm³ to 2.0 g/cm³, and wherein the non-coke proppant particles have an apparent density of from 2.0 g/cm³ to 3.0 g/cm³.

19. The hydraulic fracturing process of claim 1, wherein the first coke proppant particles comprise petroleum coke particles, and the non-coke proppant particles comprise sand proppant particles.

20. The hydraulic fracturing process of claim 1, wherein the first fracturing fluid and the second fracturing fluid comprise slickwater.

21. The hydraulic fracturing process of claim 1, wherein the first fracturing fluid consists essentially of slickwater and the first coke proppant particles, and the second fracturing fluid comprises of slickwater, the non-coke proppant particles, and second coke proppant particles.

22. The hydraulic fracturing process of claim 21, wherein the second fracturing fluid consists essentially of slickwater and the non-coke proppant particles.

23. The hydraulic fracturing process of claim 1, wherein the first coke proppant particles comprise fluid coke particles and/or flexicoke particles, wherein "flexicoke particles" are defined as solid concentrated carbon particles produced by a fluidized bed coking process using a reactor, a heater, and a gasifier.

24. The hydraulic fracturing process of claim 23, wherein the first coke proppant particles consist essentially of fluid coke particles and/or flexicoke particles.

25. A hydraulic fracturing process, the hydraulic fracturing process comprising:
during a time interval T1, pumping a first fracturing fluid comprising first coke proppant particles into a subterranean formation, such that a first weight of the first coke proppant particles, WCP1, and a total weight of proppant particles, WTP1, are pumped into the subterranean formation, wherein at least 50 weight percent (wt %) of the first coke proppant particles have particle sizes from 88 μm to 250 μm; and
during a time interval T2 that occurs before or after the time interval T1, pumping a second fracturing fluid comprising non-coke proppant particles and optionally second coke proppant particles into the subterranean formation, such that a second weight of the second coke proppant particles, if any, WCP2, and a total weight of proppant particles, WTP2, are pumped into the subterranean formation;
wherein:

$$WCP1/WCP2 \geq 1.1; \text{ and}$$

$$WCP1/(WTP1 + WTP2) \leq 0.5.$$

26. The hydraulic fracturing process of claim 25, wherein WCP1/(WTP1+WTP2)≤0.3.

27. The hydraulic fracturing process of claim 25, wherein WCP1/WCP2≥2.

28. The hydraulic fracturing process of claim 25, wherein T1 precedes T2.

29. The hydraulic fracturing process of claim 25, wherein T2 precedes T1.

30. The hydraulic fracturing process of claim 29, wherein T2 is a leading interval of a hydraulic fracturing operation.

31. The hydraulic fracturing process of claim 30, wherein:
a total weight of the proppant particles contained in the first fracturing fluid pumped into the subterranean formation during T1 is WTP1, and
a total weight of the proppant particles contained in the second fracturing fluid pumped into the subterranean formation during T2 is WTP2, and $$WTP2 \leq 0.8 * WTP1.$$

32. The hydraulic fracturing process of claim 25, wherein the first coke proppant particles have a total concentration in the first fracturing fluid from 14 kilograms per cubic meter to 480 kilograms per cubic meter, based on the volume of the carrier fluid present in the first fracturing fluid.

33. The hydraulic fracturing process of claim 25, wherein the first coke proppant particles have a total concentration in the first fracturing fluid from 18 kilograms per cubic meter to 120 kilograms per cubic meter, based on the volume of the carrier fluid present in the first fracturing fluid.

34. The hydraulic fracturing process of claim 25, wherein the first coke proppant particles have a total concentration in the first fracturing fluid from 23 kilograms per cubic meter to 96 kilograms per cubic meter, based on the volume of the carrier fluid present in the first fracturing fluid.

35. The hydraulic fracturing process of claim 25, wherein the first fracturing fluid and the second fracturing fluid comprise slickwater.

36. A hydraulic fracturing process, the hydraulic fracturing process comprising:

during a time interval T1, pumping a first fracturing fluid comprising first light weight proppant ("LWP") particles having an apparent density within a range from 1.2 g/cm$^3$ to 2.2 g/cm$^3$ into a subterranean formation, such that a first weight of the first LWP particles, WLWP1, is pumped into the subterranean formation, wherein at least 50 weight percent (wt %) of the first LWP particles have particle sizes from 88 μm to 250 μm; and during a time interval T2 that occurs before or after T1, pumping a second fracturing fluid differing from the first fracturing fluid and comprising non-LWP particles and second LWP particles into the subterranean formation, such that a second weight of the second LWP particles, WLWP2, is pumped into the subterranean formation;

wherein WLWP1/WLWP2≥1.2.

37. The hydraulic fracturing process of claim 36, wherein the first fracturing fluid and the second fracturing fluid comprise slickwater.

38. A hydraulic fracturing process, the hydraulic fracturing process comprising:

during a time interval T1, pumping a first fracturing fluid comprising first light weight proppant ("LWP") particles having an apparent density in a range from 1.2 g/cm$^3$ to 2.2 g/cm$^3$ into a subterranean formation, such that a first weight of the first LWP particles, WLWP1, and a total weight of proppant particles, WTP1, are pumped into the subterranean formation, wherein at least 50 weight percent (wt %) of the first LWP particles have particle sizes from 88 μm to 250 μm; and during a time interval T2 that occurs before or after the time interval T1, pumping a second fracturing fluid comprising non-LWP particles and second LWP particles into the subterranean formation, such that a second weight of the second LWP particles, WLWP2, and a total weight of proppant particles, WTP2, are pumped into the subterranean formation;

wherein:

$$WCP1/WCP2 \geq 1.1; \text{ and}$$

$$WCP1/(WTP1 + WTP2) \leq 0.5.$$

39. The hydraulic fracturing process of claim 38, wherein the first fracturing fluid and the second fracturing fluid comprise slickwater.

* * * * *